(12) United States Patent
Nakashima et al.

(10) Patent No.: US 10,041,584 B2
(45) Date of Patent: Aug. 7, 2018

(54) CONTROL DEVICE FOR TRANSMISSION

(71) Applicant: SUZUKI MOTOR CORPORATION, Hamamatsu-shi, Shizuoka (JP)

(72) Inventors: Hideyuki Nakashima, Hamamatsu (JP); Hiroshi Kamatsuke, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 1064 days.

(21) Appl. No.: 14/255,572

(22) Filed: Apr. 17, 2014

(65) Prior Publication Data

US 2014/0311266 A1     Oct. 23, 2014

(30) Foreign Application Priority Data

Apr. 22, 2013   (JP) ................................. 2013-089589

(51) Int. Cl.
*F16H 3/08*     (2006.01)
*F16H 61/12*    (2010.01)
(Continued)

(52) U.S. Cl.
CPC ........... *F16H 61/0021* (2013.01); *F16H 3/08* (2013.01); *F16H 59/68* (2013.01); *F16H 61/12* (2013.01); *F16H 61/688* (2013.01); *F16H 2059/683* (2013.01); *F16H 2059/6823* (2013.01); *F16H 2061/1212* (2013.01); *Y10T 74/19233* (2015.01)

(58) Field of Classification Search
None
See application file for complete search history.

(56) References Cited

U.S. PATENT DOCUMENTS 2,694,940 A     11/1954   Schmitter .................... 74/359
4,790,418 A *   12/1988   Brown .................. F16H 61/061
                                                    192/103 F
(Continued)

FOREIGN PATENT DOCUMENTS

CN      101260937 A     9/2008
CN      102996788 A     3/2013
(Continued)

OTHER PUBLICATIONS

Japanese Office Action dated Dec. 20, 2016, issued by the Japanese Patent Office in corresponding application JP 2013-089589.
(Continued)

*Primary Examiner* — Colby M Hansen
(74) *Attorney, Agent, or Firm* — Stein IP, LLC

(57) ABSTRACT

There is provided a control device for a transmission for shifting a driving force of an engine. The transmission includes at least two input shafts configured to be driven by the driving force of the engine, intermediate shafts provided correspondingly to the at least two input shafts and configured such that driving forces of the input shafts are respectively transmitted thereto, and a clutch provided between the input shafts and the intermediate shafts and configured to transmit the driving forces from the input shafts to the intermediate shafts. A non-use shaft detection section is configured to detect a non-use state of the intermediate shafts based on a transmission state of the clutch.

15 Claims, 20 Drawing Sheets

(51) Int. Cl.
*F16H 59/68* (2006.01)
*F16H 61/00* (2006.01)
*F16H 61/688* (2006.01)

(56) References Cited

U.S. PATENT DOCUMENTS

| | | | | |
|---|---|---|---|---|
| 5,667,052 | A * | 9/1997 | Richardson | F16H 61/2807 192/109 F |
| 6,679,134 | B2 * | 1/2004 | Shigyo | B60W 10/02 477/86 |
| 6,878,095 | B2 * | 4/2005 | Shigyo | F16D 48/06 477/175 |
| 2002/0151408 | A1 | 10/2002 | Nishina et al. | 477/34 |
| 2005/0064987 | A1 | 3/2005 | Budal et al. | 477/3 |
| 2007/0049457 | A1 | 3/2007 | Sato et al. | 477/97 |
| 2008/0006029 | A1 | 1/2008 | Kitou et al. | 60/459 |
| 2009/0105917 | A1 | 4/2009 | Schweizer | 701/67 |
| 2009/0145253 | A1 | 6/2009 | Katakura et al. | 74/335 |
| 2011/0205039 | A1 | 8/2011 | Tsuyuguchi et al. | 340/425.5 |

FOREIGN PATENT DOCUMENTS

| | | |
|---|---|---|
| DE | 10 2007 037 589 A1 | 2/2009 |
| DE | 10 2012 213 759 A1 | 2/2013 |
| EP | 2 360 399 B1 | 2/2011 |
| JP | 2002-310282 A | 10/2002 |
| JP | A 2002 286049 | 10/2002 |
| JP | 2007-57057 A | 3/2007 |
| JP | 2007-247765 A | 9/2007 |
| JP | 2007-327504 A | 12/2007 |
| JP | 2009-156464 A | 7/2009 |
| JP | 2011-69390 A | 4/2011 |
| JP | 2011-174489 A | 9/2011 |
| WO | WO 2007/101418 A1 | 9/2007 |

OTHER PUBLICATIONS

Chinese Office Action with search report dated Dec. 2, 2015, issued by the Chinese Patent Office in corresponding application 201410160871.X.

German Office Action dated Nov. 29, 2017, issued by the German Patent and Trademark Office in corresponding application DE 10 2014 005 768.2.

* cited by examiner

| MAP OF PRIMARY HYDRAULIC PRESSURE | |
|---|---|
| Voltage | Pa |
| v1 | p1 |
| v2 | p2 |
| v3 | p3 |
| | |
| | |
| | |
| | |
| | |

| MAP OF ODD-NUMBERED SHAFT-SIDE HYDRAULIC PRESSURE | |
|---|---|
| Voltage | Pa |
| v1 | p1 |
| v2 | p2' |
| v3 | p3 |
| | |
| | |
| | |
| | |
| | |

|p2-p'2| < SETTING VALUE

COMPENSATE BY ADDING VALUE OF p2 TO p2'

CONTROL DEVICE FOR TRANSMISSION

The disclosure of Japanese Patent Application No. 2013-089589 filed on Apr. 22, 2013, including specification, drawings and claims is incorporated herein by reference in its entirety.

TECHNICAL FIELD

The present invention relates to a control device for a transmission, and, more specifically, to a control device for a transmission which can detect a non-use portion of the transmission applied to a vehicle.

BACKGROUND

In conventional transmissions, there has been known a dual clutch transmission (DCT) including two input shafts rotated by a driving force of an internal combustion engine, intermediate shafts installed correspondingly to the two input shafts, and a clutch transmitting the driving force to each corresponding intermediate shaft from the two input shafts and shifts gears by controlling an engaged/disengaged state of the clutch and thus selecting the intermediate shaft coupled to the input shaft.

As a known document, for example, like Patent Document 1 below, a control to prevent the increase in engine speed of the internal combustion engine occurring since one of left and right wheels drifts on the air when a vehicle drives on a rough road, there has been disclosed a control device for a transmission including a motor generator disposed to one intermediate shaft, in which regenerative power generation is performed by the motor generator in a case where a rotational difference between the left and right wheels increases.

A control device for the transmission performs abnormality diagnosis to secure stability in operation, and performs warning when the abnormality is detected. Further, since an error occurs in operation of the transmission due to its aged deterioration, a control device for the transmission performs a compensation control to correct the error.

Patent Document 1: Japanese Patent Application Publication No. 2011-069390A

However, the transmission has a problem in that since a shift control is executed irrespective of the driving or stopping of the vehicle, it is difficult to ascertain with accuracy the state of the transmission during its use.

SUMMARY

It is therefore an object of the present invention to provide a control device for a transmission which can ascertain with accuracy a state of the transmission.

In order to achieve the above object, according to an aspect of the embodiments of the present invention, there is provided a control device for a transmission for shifting a driving force of an engine, the transmission including at least two input shafts configured to be driven by the driving force of the engine, intermediate shafts provided correspondingly to the at least two input shafts and configured such that driving forces of the input shafts are respectively transmitted thereto, and a clutch provided between the input shafts and the intermediate shafts and configured to transmit the driving forces from the input shafts to the intermediate shafts, the control device including a non-use shaft detection section configured to detect a non-use state of the intermediate shafts based on a transmission state of the clutch.

The control device for the transmission can accurately detect the non-use of the intermediate shaft, since the non-use state of the intermediate shaft is detected based on the transmission state of the clutch.

DETAILED DESCRIPTION OF THE EMBODIMENTS

Figure 1:
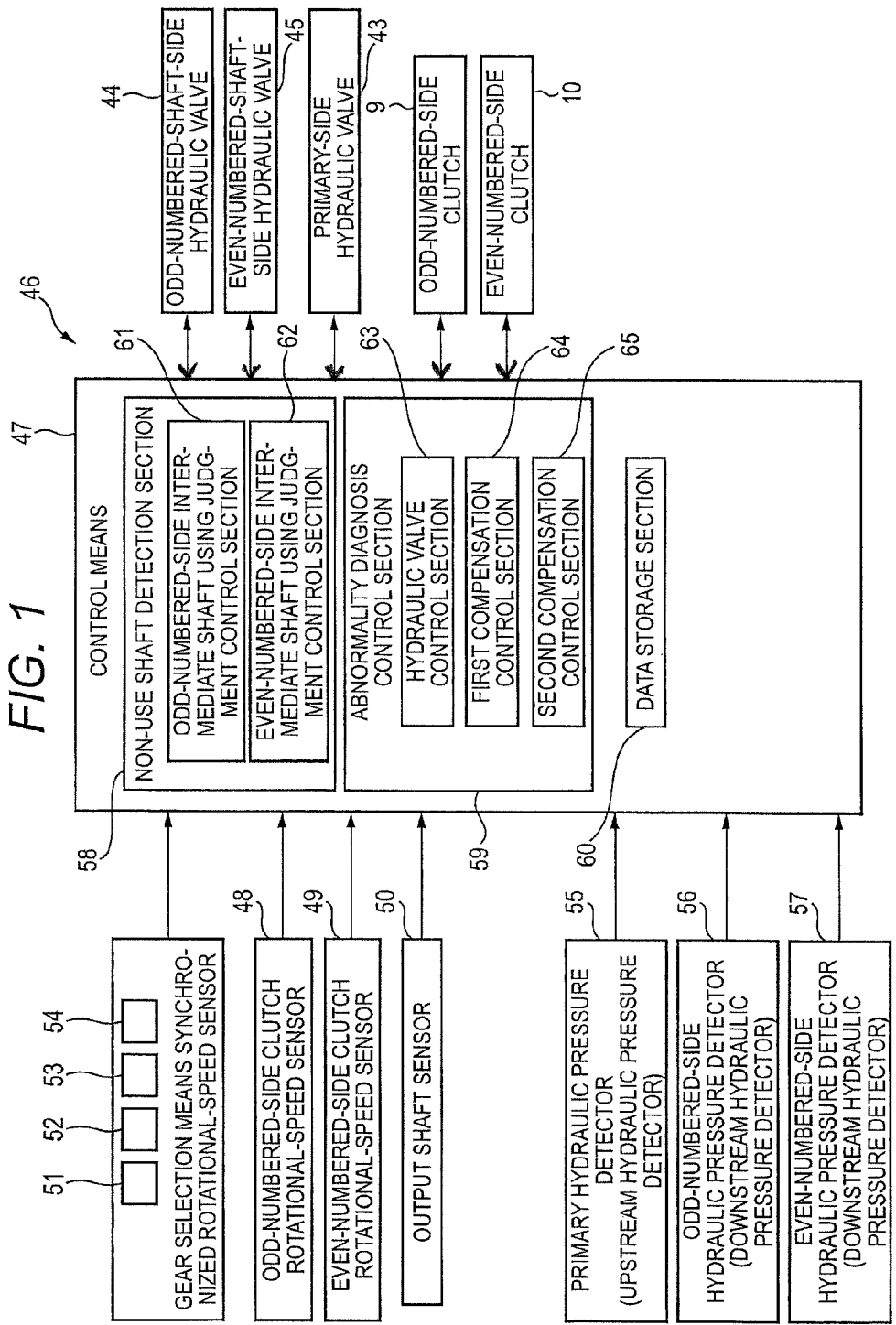
FIG. 1 is a system configuration diagram of a control device for a transmission according to a first embodiment.

Embodiments of the present invention will be described hereinafter with reference to the accompanying drawings.

First Embodiment

FIGS. 1 to 18 show the first embodiment of the present invention. In FIG. 2, an engine 2, such as an internal combustion engine, mounted on a vehicle 1 is coupled to a transmission 3 shifting a generated power. The transmission 3 includes at least two input shafts, that is, an odd-numbered input shaft 5 and an even-numbered input shaft 6, driven by a rotational shaft 4 of the engine 2, two intermediate shafts, that is, an odd-numbered intermediate shaft 7 and an even-numbered intermediate shaft 8, respectively provided to the two input shafts, that is, the odd-numbered input shaft 5 and the even-numbered input shaft 6, an odd-numbered clutch 9 provided between the odd-numbered input shaft 5 and the odd-numbered intermediate shaft 7, an even-numbered clutch 10 provided between the even-numbered input shaft 6 and the even-numbered intermediate shaft 8, and one output shaft 11 transmitted by the power from the odd-numbered intermediate shaft 7 and the even-numbered intermediate shaft 8.

The odd-numbered input shaft 5 and the even-numbered input shaft 6 are provided in parallel to the rotational shaft 4 so that the power of the rotational shaft 4 of the engine 2 is transmitted to each input shaft by a distribution mechanism (not illustrated). The odd-numbered intermediate shaft 7 and the even-numbered intermediate shaft 8 are provided in series with respect to the odd-numbered input shaft 5 and the even-numbered input shaft 6 so that the power of the odd-numbered input shaft 5 and the even-numbered input shaft 6 is respectively transmitted to the intermediate shafts. The odd-numbered clutch 9 transmits the power to odd-numbered intermediate shaft 7 from the odd-numbered input shaft 5, or interrupts the power. The even-numbered clutch 10 transmits the power to the even-numbered intermediate shaft 8 from the even-numbered input shaft 6, or interrupts the power. The output shaft 11 is provided in parallel with respect to the even-numbered input shaft 6 and the even-numbered intermediate shaft 8, and the power of the even-numbered input shaft 6 and the even-numbered intermediate shaft 8 is transmitted to any one of gear trains 12 to 15 and 28 to 30 which will be described hereinafter.

A first-speed gear train 12, a third-speed gear train 13, a fifth-speed gear train 14, and a reverse gear train 15 which constitute gears of an odd number of speeds are disposed between the odd-numbered intermediate shaft 7 and the output shaft 11.

The first-speed gear train 12 consists of a first-speed driving gear 16 rotatably disposed at one end side of the odd-numbered intermediate shaft 7 which is close to the odd-numbered clutch 9 in an axial direction, and a first-speed/second-speed driven gear 17 non-rotatably disposed at the output shaft 11 to be meshed with the first-speed driving gear 16.

The third-speed gear train 13 consists of a third-speed driving gear 18 rotatably disposed at the other side of the odd-numbered intermediate shaft 7 rather than the first-speed driving gear 16 in the axial direction, and a third-speed/fourth-speed driven gear 19 non-rotatably disposed at the output shaft 11 to be meshed with the third-speed driving gear 18.

The fifth-speed gear train 14 consists of a fifth-speed driving gear 20 rotatably disposed at the other side of the odd-numbered intermediate shaft 7 rather than the third-speed driving gear 18 in the axial direction, and a fifth-speed/sixth-speed driven gear 21 non-rotatably disposed at the output shaft 11 to be meshed with the fifth-speed driving gear 20.

The reverse gear train 15 consists of a reverse driving gear 22 rotatably disposed at the other side of the odd-numbered intermediate shaft 7 rather than the third-speed driving gear 18 in the axial direction, a reverse driven gear 23 non-rotatably disposed at a position of the output shaft 11 corresponding to the reserve driving gear 22 in the axial direction, and a reverse idler gear 25 rotatably disposed by an idler shaft 24 to be meshed with the reverse driving gear 22 and the reverse driven gear 23.

Between the first-speed driving gear 16 and the third-speed driving gear 18 in the axial direction of the odd-numbered intermediate shaft 7, a first-speed/third-speed gear selection means 26 for selectively engaging or disengaging the first-speed driving gear 16 or the third-speed driving gear 18 to or from the odd-numbered intermediate shaft 7 is disposed. Further, between the fifth-speed driving gear 20 and the reverse driving gear 22 in the axial direction of the odd-numbered intermediate shaft 7, a fifth-speed/reverse gear selection means 27 for selectively engaging or disengaging the fifth-speed driving gear 20 or the reverse driving gear 22 to or from the odd-numbered intermediate shaft 7 is disposed.

The first-speed/third-speed gear selection means 26 and the fifth-speed/reverse gear selection means 27 have a synchromesh mechanism.

Between the even-numbered intermediate shaft 8 and the output shaft 11, a second-speed gear train 28, a fourth-speed gear train 29, and a sixth-speed gear train 30 which constitute gears of an even number of speeds are disposed.

The second-speed gear train 28 consists of a second-speed driving gear 31 rotatably disposed at a position corresponding to the first-speed driving gear 16 in the axial direction of the even-numbered intermediate shaft 8, and the first-speed/second-speed driven gear 17 non-rotatably disposed at the output shaft 11 to be meshed with the second-speed driving gear 31.

The fourth-speed gear train 29 consists of a fourth-speed driving gear 32 rotatably disposed at a position corresponding to the third-speed driving gear 18 in the axial direction of the even-numbered intermediate shaft 8, and the third-speed/fourth-speed driven gear 19 non-rotatably disposed at the output shaft 11 to be meshed with the fourth-speed driving gear 32.

The sixth-speed gear train 30 consists of a sixth-speed driving gear 33 rotatably disposed at a position corresponding to the fifth-speed driving gear 20 in the axial direction of the even-numbered intermediate shaft 8, and the fifth-speed/sixth-speed driven gear 21 non-rotatably disposed at the output shaft 11 to be meshed with the sixth-speed driving gear 33. Between the second-speed driving gear 31 and the fourth-speed driving gear 32 in the axial direction of the even-numbered intermediate shaft 8, a second-speed/fourth-speed gear selection means 34 for selectively engaging or disengaging the second-speed driving gear 31 or the fourth-speed driving gear 32 to or from the even-numbered intermediate shaft 8 is disposed.

Further, at the other side of the even-numbered intermediate shaft 8 rather than the sixth-speed driving gear 33, a sixth-speed gear selection means 35 for engaging or disengaging the sixth-speed driving gear 33 to or from the even-numbered intermediate shaft 8 is disposed.

The second-speed/fourth-speed gear selection means 34 and the sixth-speed gear selection means 35 have a synchromesh mechanism.

The transmission 3 is connected to a differential device 36 at the other end side of the output shaft 11 in the axial direction. The differential device 36 is coupled to driving wheels 38 by a driving axle 37.

The transmission 3 shifts the power transmitted to the odd-numbered intermediate shaft 7 or the even-numbered intermediate shaft 8 via the odd-numbered clutch 9 or the even-numbered clutch 10 by any one of gear trains 12 to 15 and 28 to 30 to transmit it to the output shaft 11. The power transmitted to the output shaft 11 is transmitted to the driving wheels 38 via the driving axle 37 by the differential device 36, driving the vehicle 1.

The transmission 3 is a dual clutch transmission (DCT) which changes a transmission path of the transmission 3 by controlling the engagement/disengagement of the odd-numbered clutch 9 and the even-numbered clutch 10 and thus selecting the odd-numbered intermediate shaft 7 and the even-numbered intermediate shaft 8 which are coupled to the odd-numbered input shaft 5 and the even-numbered input shaft 6 to selectively couple the first-speed gear train 12, the third-speed gear train 13, the fifth-speed gear train 14, the reverse gear train 15, the second-speed gear train 28, the fourth-speed gear train 29, and the sixth-speed gear train 30 and thus perform the gear shifting of the transmission 3.

Figure 3:
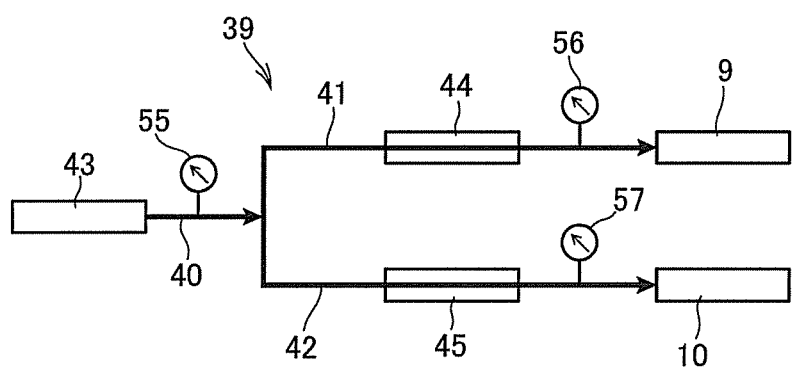
FIG. 3 is a hydraulic circuit diagram of odd-numbered clutches and even-numbered clutches according to the first embodiment.

The odd-numbered clutch 9 and the even-numbered clutch 10 of the transmission 3 consist of a hydraulic clutch of which engaging/disengaging operation of transmitting or interrupting the power is controlled by hydraulic pressure. As illustrated in FIG. 3, the odd-numbered clutch 9 and the even-numbered clutch 10 are controlled by the hydraulic pressure of oil fed by an oil passage 39. The oil passage 39 has a primary passage 40 connected to a hydraulic source, such as an oil pump (not illustrated), at an upstream side thereof, and an odd-number-side branch passage 41 and an even-numbered-side passage 42 which are respectively connected to the odd-numbered clutch 9 and the even-numbered clutch 10 at a downstream side thereof.

The oil passage 39 supplies the odd-numbered clutch 9 and the even-numbered clutch 10 with the oil fed from the hydraulic source to the primary passage 40, via the odd-number-side branch passage 41 and the even-numbered-side branch passage 42.

The primary passage 40, the odd-number-side branch passage 41 and the even-numbered-side branch passage 42 are respectively provided with a primary-side hydraulic valve 43, an odd-numbered-shaft-side hydraulic valve 44, and an even-numbered shaft-side hydraulic valve 45 as hydraulic valves for controlling the hydraulic pressure to the odd-numbered clutch 9 and the even-numbered clutch 10.

The primary-side hydraulic valve 43, the odd-numbered-shaft-side hydraulic valve 44, and the even-numbered-shaft-side hydraulic valve 45 adjust a flow rate of the oil flowing in the primary passage 40, the odd-number-side branch passage 41 and the even-numbered-side branch passage 42 by opening/closing operation to respectively control the engaging/disengaging operation of the odd-numbered clutch 9 and the even-numbered clutch 10.

Figure 2:
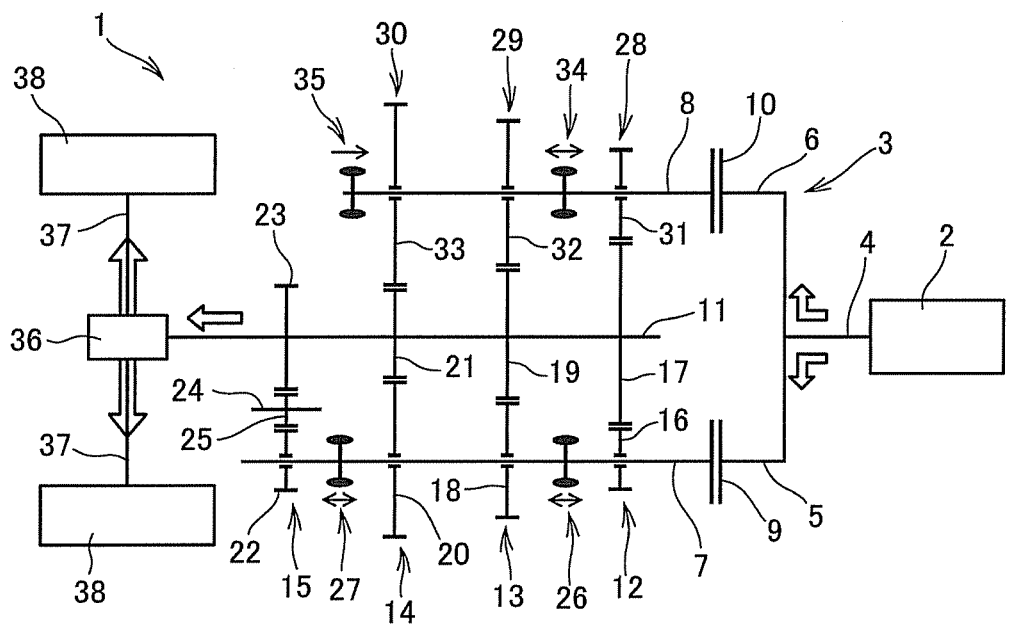
FIG. 2 is a schematic view of the transmission according to the first embodiment.

The odd-numbered clutch 9, the even-numbered clutch 10, the primary-side hydraulic valve 43, the odd-numbered-shaft-side hydraulic valve 44, and the even-numbered-shaft-side hydraulic valve 45, are connected to a control means 47 constituting a control device 46 for the transmission 3, as illustrated in FIG. 1. The control means 47 adjusts an opening degree of the primary-side hydraulic valve 43, the odd-numbered-shaft-side hydraulic valve 44, and the even-numbered-shaft-side hydraulic valve 45 to change the transmission path of the transmission 3 and thus selectively connecting the first-speed gear train 12, the third-speed gear train 13, the fifth-speed gear train 14, the reverse gear train 15, the second-speed gear train 28, the fourth-speed gear train 29, and the sixth-speed gear train 30 by the first-speed/third-speed gear selection means 26, the fifth-speed/reverse gear selection means 27, the second-speed/fourth-speed gear selection means 34, and the sixth-speed gear selection means 35.

Figure 4:
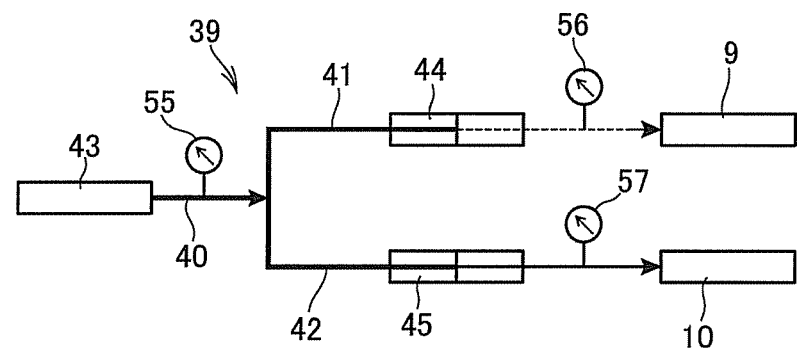
FIG. 4 is a hydraulic circuit diagram illustrating a hydraulic control state at engagement of the even-numbered clutches according to the first embodiment.
Figure 5:
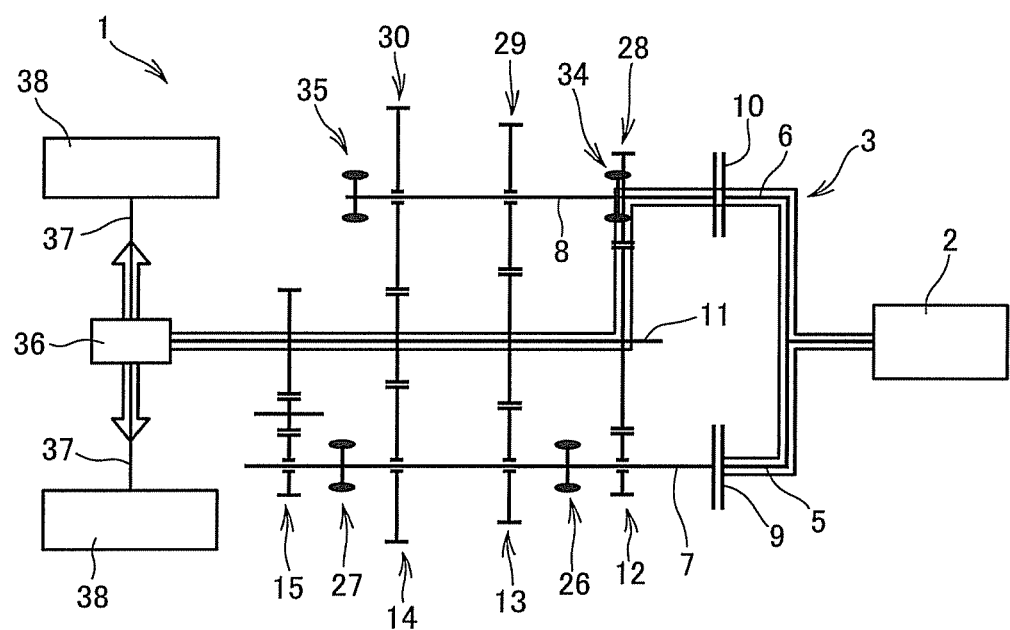
FIG. 5 is a schematic view of the transmission illustrating a power transmitting state at the engagement of the even-numbered clutches according to the first embodiment.

With the control means 47, for example, in a case where a shift position of the transmission 3 is selected from the first speed to the second speed in a drive range, as illustrated in FIG. 4, after the odd-numbered-shaft-side hydraulic valve 44 is closed and thus the odd-numbered clutch 9 is disengaged (released), as illustrated in FIG. 5, the first-speed/third-speed gear selection means 26 of the odd-numbered intermediate shaft 7 releases the connection of the first-speed gear train 12. Meanwhile, as illustrated in FIG. 5, the second-speed/fourth-speed gear selection means 34 connects the second-speed gear train 28 with the odd-numbered clutch 9, and then, as illustrated in FIG. 4, the opening degree of the even-numbered-shaft-side hydraulic valve 45 is adjusted according to the driving state, thereby controlling the hydraulic pressure to appropriately connect (engage) the even-numbered clutch 10.

The transmission 3 is converted to the second-speed shift position to be a transmission state illustrated in FIG. 5. This state is a state to be executed in a case where the vehicle 1 drives with the transmission 3 of the second speed.

Figure 6:
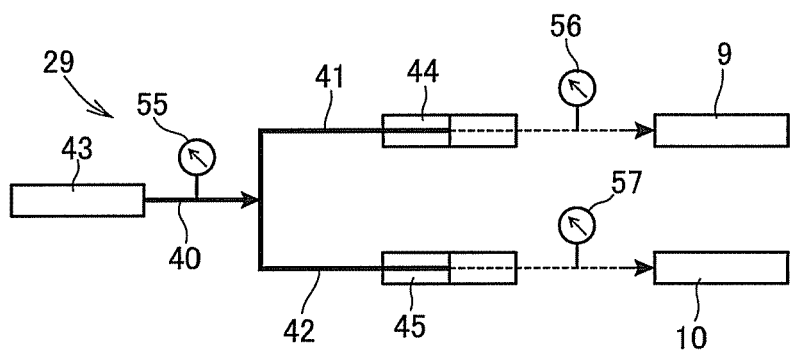
FIG. 6 is a hydraulic circuit diagram illustrating a hydraulic control state at disengagement of the odd-numbered clutches and the even-numbered clutches according to the first embodiment.
Figure 7:
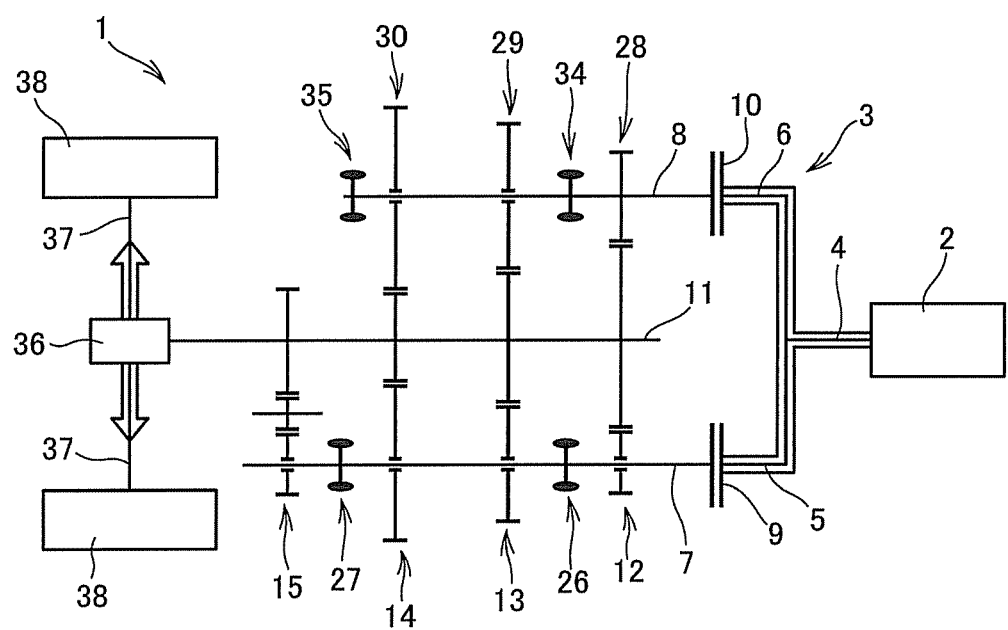
FIG. 7 is a schematic view of the transmission illustrating a power transmitting state at the disengagement of the odd-numbered clutches and the even-numbered clutches according to the first embodiment.

Further, with the control means 47, for example, in a case where a shift position of the transmission 3 is selected as a neutral range or a parking range, as illustrated in FIG. 6, after the odd-numbered-shaft-side hydraulic valve 44 is closed and thus the odd-numbered clutch 9 is disengaged (released), as illustrated in FIG. 7, the first-speed/third-speed gear selection means 26 releases the connection of the selected gear train (e.g., first-speed gear train 12). Meanwhile, in the even-numbered intermediate shaft 8, as illustrated in FIG. 6, the even-numbered clutch 10 is maintained in the disengaged state (released state), and as illustrated in FIG. 7, the connection of the gear train (e.g., second-speed gear train 28 or the like) is released.

The transmission 3 is in the transmission state illustrated in FIG. 7, in which the odd-numbered clutch 9 and the even-numbered clutch 10 are disengaged. This state is a state to be executed in a case where the power of the engine 2 is not necessary, for example, the vehicle 1 stops.

Various detectors 48 to 57 are connected to the control means 47, as illustrated in FIG. 1, so that the control device 46 of the transmission 3 accurately determines the state of the transmission 3 to perform the abnormality diagnosis or the compensation control.

The control means 47 is connected to an odd-numbered-side clutch rotational-speed sensor 48, an even-numbered-side clutch rotational-speed sensor 49, an output shaft rotational-speed sensor 50, a first-speed/third-speed gear selection means synchronized rotational-speed sensor 51, a fifth-speed/reverse gear selection means synchronized rotational-speed sensor 52, a second-speed/fourth-speed gear selection means synchronized rotational-speed sensor 53, and a sixth-speed gear selection means synchronized rotational-speed sensor 54 to determine the non-use state of the odd-numbered intermediate shaft 7 and the even-numbered intermediate shaft 8.

The odd-numbered-side clutch rotational-speed sensor 48 detects the rotational speed of the odd-numbered input shaft 5. The even-numbered-side clutch rotational-speed sensor 49 detects the rotational speed of the even-numbered input shaft 6. The output shaft rotational-speed sensor 50 detects the rotational speed of the output shaft 11. A gear selection means synchronized rotational speed sensor comprises: a first-speed/third-speed gear selection means synchronized rotational-speed sensor 51, a fifth-speed/reverse gear selection means synchronized rotational-speed sensor 52, a second-speed/fourth-speed gear selection means synchronized rotational-speed sensor 53, and a sixth-speed gear selection means synchronized rotational-speed sensor. The first-speed/third-speed gear selection means synchronized rotational-speed sensor 51 detects the transmission state of the first-speed/third-speed gear selection means 26. The fifth-speed/reverse gear selection means synchronized rotational-speed sensor 52 detects the transmission state of the fifth-speed/reverse gear selection means 27. The second-speed/fourth-speed gear selection means synchronized rotational-speed sensor 53 detects the transmission state of the second-speed/fourth-speed gear selection means 34. The sixth-speed gear selection means synchronized rotational-speed sensor 54 detects the transmission state of the sixth-speed gear selection means 35. In this instance, the synchronized rotational speed can be calculated from the rotational speed of the output shaft 11 and a gear ratio of the respective speed gear trains 12 to 15 and 28 to 30.

Further, the control means 47 is connected to a primary hydraulic pressure detector 55 which is an upstream-side hydraulic pressure detector for detecting an upstream-side hydraulic pressure of the oil passage 39, and an odd-numbered-side hydraulic detector 56 and an even-numbered-side hydraulic pressure detector 57 which are downstream-side hydraulic pressure detectors for detecting a downstream-side hydraulic pressure of the oil passage 39. The primary hydraulic pressure detector 55 is provided among the primary-side hydraulic valve 43 of the primary passage 40, the odd-numbered-shaft-side hydraulic valve 44 of the odd-numbered-side branch passage 41, and the even-numbered-shaft-side hydraulic valve 45 of the even-numbered-side branch passage 42, to detect the upstream-side hydraulic pressure (primary hydraulic pressure) of the odd-numbered-side branch passage 41 and the even-numbered-side branch passage 42.

The odd-numbered-side hydraulic pressure detector 56 is provided at the downstream side of the odd-numbered-side branch passage 41 rather than the odd-numbered-shaft-side hydraulic valve 44 to detect the downstream hydraulic pressure (odd-numbered-shaft-side hydraulic pressure) of the odd-numbered-side branch passage 41. The even-numbered-side hydraulic pressure detector 57 is provided at the downstream side of the even-numbered-side branch passage 42 rather than the even-numbered-shaft-side hydraulic valve 45 to detect the downstream hydraulic pressure (even-numbered-shaft-side hydraulic pressure) of the even-numbered-side branch passage 42.

The control means 47 includes a non-use shaft detection section 58 and an abnormality diagnosis control section 59 which perform the control using the detected values of various detectors 48 to 57, and also includes a data storage section 60.

The non-use shaft detection section 58 has an odd-numbered-side intermediate shaft using judgment control section 61 and an even-numbered-side intermediate shaft using judgment control section 62. The odd-numbered-side intermediate shaft using judgment control section 61 determines whether the odd-numbered intermediate shaft 7 is using, from the disengaged state of the odd-numbered clutch 9 and the engaged state of the first-speed gear train 12, the third-speed gear train 13, the fifth-speed gear train 14 and the reverse gear train 15. The even-numbered-side intermediate shaft using judgment control section 62 determines whether the even-numbered intermediate shaft 8 is using, from the disengaged state of the even-numbered clutch 10 and the engaged state of the second-speed gear train 28, the fourth-speed gear train 29, and the sixth-speed gear train 30.

From the judged results of the odd-numbered-side intermediate shaft using judgment control section 61 and the even-numbered-side intermediate shaft using judgment control section 62, the non-use shaft detection section 58 detects the non-use state of the odd-numbered intermediate shaft 7 and the even-numbered intermediate shaft 8 based on the transmission state of the odd-numbered clutch 9 and the even-numbered clutch 10. Further, from the judged results of the odd-numbered-side intermediate shaft using judgment control section 61 and the even-numbered-side intermediate shaft using judgment control section 62, the non-use shaft detection section 58 detects the non-use state of the odd-numbered intermediate shaft 7 and the even-numbered intermediate shaft 8 based on the transmission state of the first-speed/third-speed gear selection means 26, the fifth-speed/reverse gear selection means 27, the second-speed/fourth-speed gear selection means 34, and the sixth-speed gear selection means 35.

The abnormality diagnosis control section 59 performs the abnormality diagnosis of the primary hydraulic pressure detector 55, the odd-numbered-side hydraulic detector 56, and the even-numbered-side hydraulic pressure detector 57 which are hydraulic pressure detectors according to the odd-numbered intermediate shaft 7 or the even-numbered intermediate shaft 8 which is judged as the non-use state by the non-use shaft detection section 58. The primary hydraulic pressure detector 55, the odd-numbered-side hydraulic detector 56, and the even-numbered-side hydraulic pressure detector 57 detect the hydraulic pressure of the oil for use in the operation of the odd-numbered clutch 9 and the even-numbered clutch 10.

Further, the abnormality diagnosis control section 59 judges the abnormality when the hydraulic pressure (primary hydraulic pressure) detected by the primary hydraulic pressure detector 55 which is the upstream hydraulic pressure detector, the hydraulic pressure (odd-numbered-shaft-side hydraulic pressure) detected by the odd-numbered-side hydraulic detector 56, or the even-numbered intermediate shaft 8 or the hydraulic pressure (even-numbered-shaft-side hydraulic pressure) detected by the even-numbered-side hydraulic pressure detector 57, which are at least two downstream hydraulic pressure detectors judged as the non-use state is the setting value or more In addition, the abnormality diagnosis control section 59 has a hydraulic valve control section 63, a first compensation control section 64, and a second compensation control section 65. The hydraulic valve control section 63 opens the odd-numbered-shaft-side hydraulic valve 44 and/or the even-numbered-shaft-side hydraulic valve 45 based on the detected results of the non-use shaft detection section 58, thereby enabling the oil for diagnosis to flow through the odd-numbered-side branch passage 41 and/or the even-numbered-side branch passage 42.

The first compensation control section 64 compensates the hydraulic pressure detected by the odd-numbered-side hydraulic detector 56 or the even-numbered-side hydraulic pressure detector 57 to be the hydraulic pressure of the primary hydraulic pressure detector 55, when a difference between the hydraulic pressure detected by the primary hydraulic pressure detector 55 and the hydraulic pressure detected by the odd-numbered-side hydraulic detector 56 or the even-numbered-side hydraulic pressure detector 57 is less than a setting value.

When the difference between the hydraulic pressure detected by the primary hydraulic pressure detector 55 and the hydraulic pressure detected by the odd-numbered-side hydraulic detector 56 or the even-numbered-side hydraulic pressure detector 57 is a setting value or more, that is, when it is judged as the abnormality, the second compensation control section 65 compensates the hydraulic pressure detected by the primary hydraulic pressure detector 55, the odd-numbered-side hydraulic detector 56, or the even-numbered-side hydraulic pressure detector 57, of which the difference of the hydraulic pressure is the setting value or more, by any one of the primary hydraulic pressure detector 55, the odd-numbered-side hydraulic detector 56, and the even-numbered-side hydraulic pressure detector 57, of which the difference of the hydraulic pressure is less than the setting value.

The data storage section 60 is stored with the synchronized rotational speed of the first-speed/third-speed gear selection means 26, the fifth-speed/reverse gear selection means 27, the second-speed/fourth-speed gear selection means 34, and the sixth-speed gear selection means 35. The synchronized rotational speed stored in the data storage section 60 is used for the non-use judgment of the odd-numbered intermediate shaft 7 and the even-numbered intermediate shaft 8 by the non-use shaft detection section 58.

Further, the data storage section 60 is stored with a characteristic map of the respective hydraulic pressure detectors 55 to 57. The characteristic map of the respective hydraulic pressure detectors 55 to 57 stored in the data storage section 60 is used for the abnormality judgment of the respective hydraulic pressure detectors 55 to 57 by the abnormality diagnosis control section 59.

Next, the operation of the first embodiment will be described.

Figure 8:
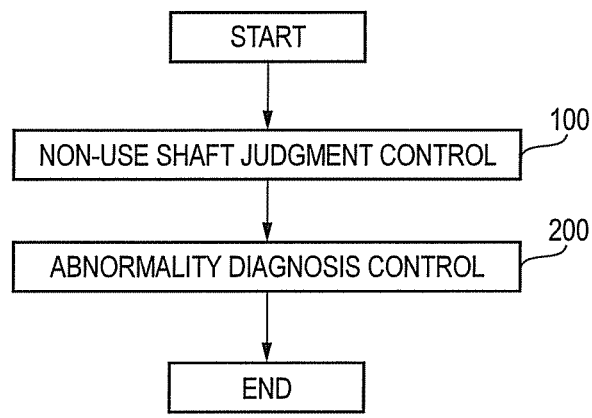
FIG. 8 is a main flowchart of the control device according to the first embodiment.

If the control program starts, as illustrated in FIG. 8, the control device 46 for the transmission 3 performs the non-use shaft judgment control (step 100), and performs the abnormality diagnosis control (step 200), and then the program ends. The control is repeatedly executed at given time intervals. If electricity is supplied to the control device 46, the control is executed irrespective of the start state of the engine 2.

Figure 9:
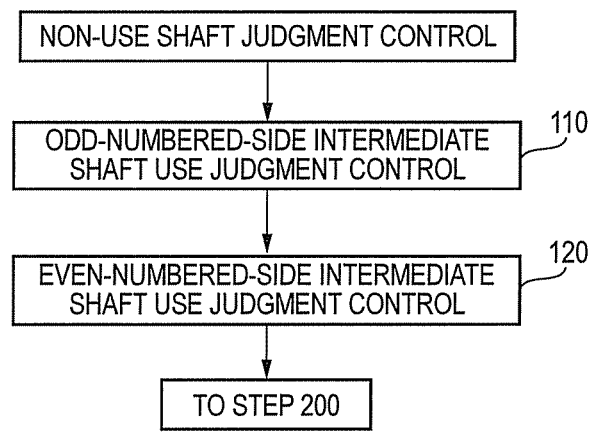
FIG. 9 is a flowchart of a non-used shaft judgment control according to the first embodiment.

In the non-use shaft judgment control (step 100), as illustrated in FIG. 9, the odd-numbered-side intermediate shaft using judgment control is performed (step 110), the even-numbered-side intermediate shaft using judgment control is performed (step 120), and it proceeds to the abnormality diagnosis control (step 200).

Figure 10:
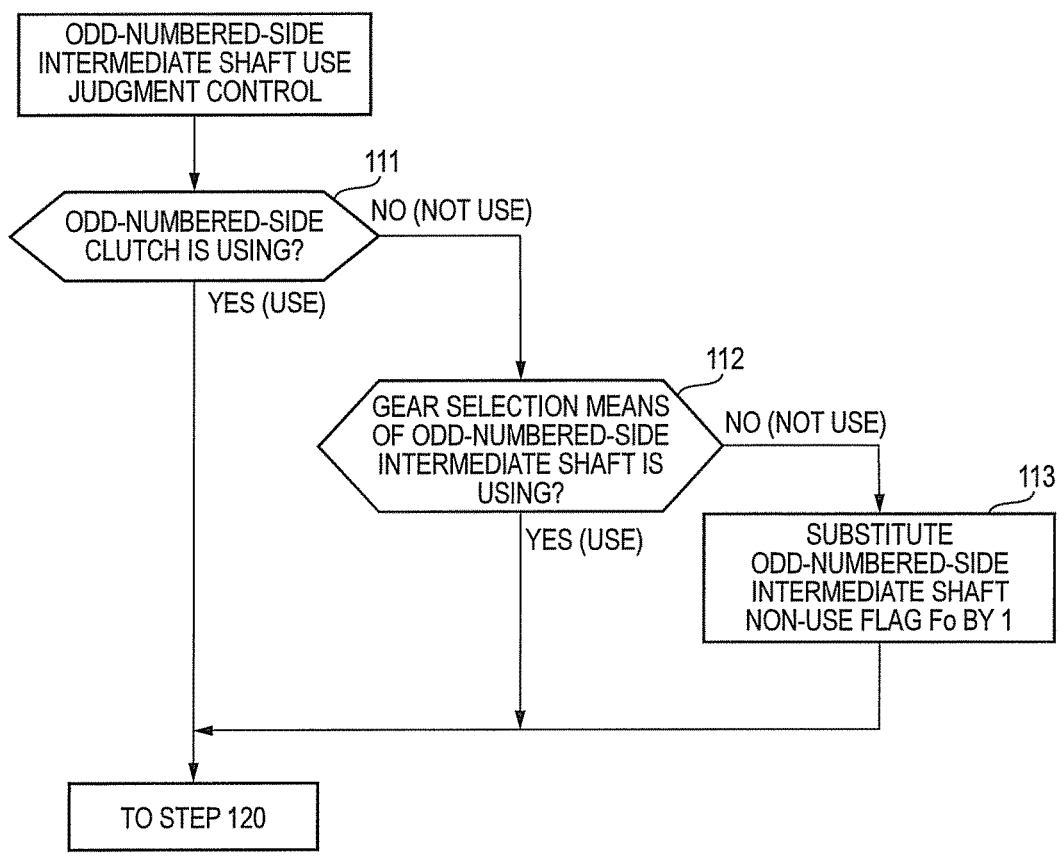
FIG. 10 is a flowchart of an odd-numbered intermediate shaft using judgment control according to the first embodiment.

In the odd-numbered-side intermediate shaft using judgment control (step 110), as illustrated in FIG. 10, it is determined whether odd-numbered clutch 9 is using, based on the detected value of the odd-numbered-side hydraulic detector 56 (step 111).

If it is YES in the determination (step 111), it proceeds to the even-numbered-side intermediate shaft using judgment control (step 120). If it is NO in the determination (step 111), it is determined whether the first-speed/third-speed gear selection means 26 or the fifth-speed/reverse gear selection means 27 which is provided to the odd-numbered intermediate shaft 7 is using (step 112).

In the determination (step 112), for example, when shifting gear from the second speed to the third speed, it is determined whether the first-speed/third-speed gear selection means 26 is using, by the determination of whether the rotational speed of the odd-numbered intermediate shaft 7 coincides with the synchronized rotational speed previously measured and stored in the data storage section 60.

If it is YES in the determination (step 112), it proceeds to the even-numbered-side intermediate shaft using judgment control (step 120). If it is NO in the determination (step 112), since the odd-numbered clutch 9, the first-speed/third-speed gear selection means 26, and the fifth-speed/reverse gear selection means 27 are not used, it is determined that the odd-numbered intermediate shaft 7 is not used, and an odd-numbered intermediate shaft non-use flag Fo (Fo=Flag of odd number side) is substituted by one (1) (step 113). Subsequently, it proceeds to the even-numbered-side intermediate shaft using judgment control (step 120).

Figure 11:
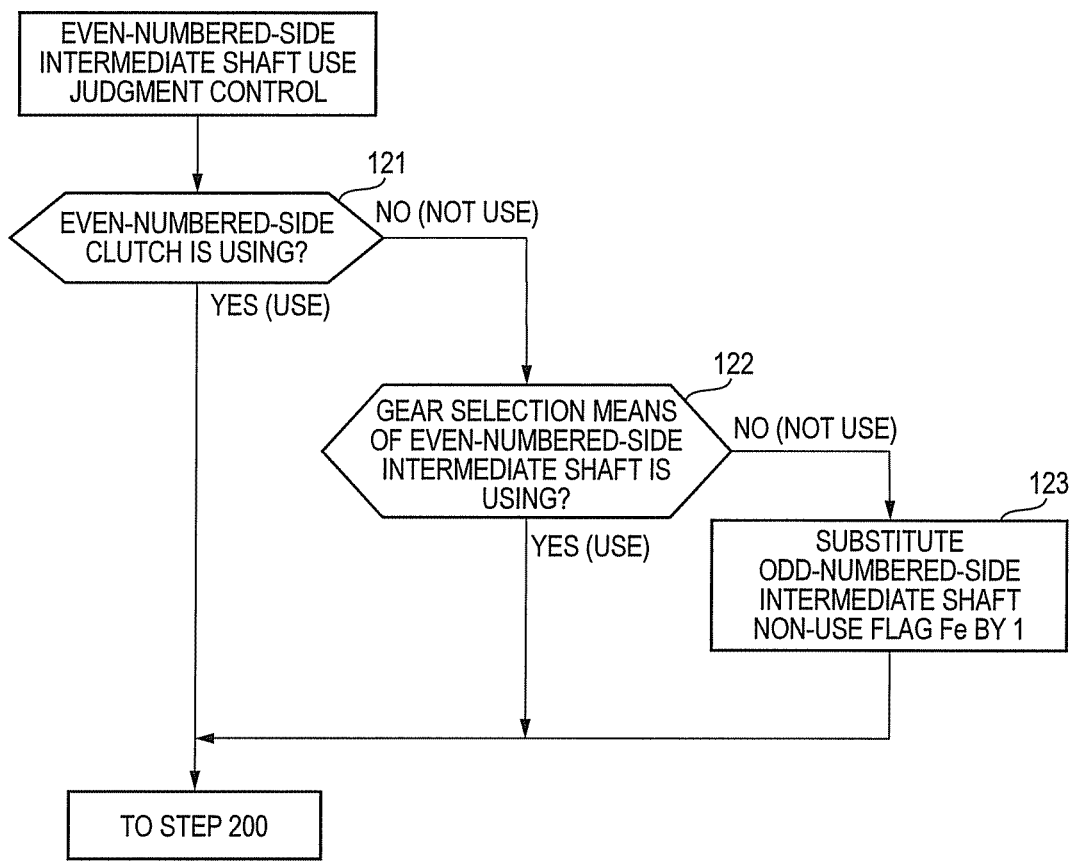
FIG. 11 is a flowchart of an even-numbered intermediate shaft using judgment control according to the first embodiment.

In the even-numbered-side intermediate shaft using judgment control (step 120), as illustrated in FIG. 11, it is determined whether the even-numbered clutch 10 is using, based on the detected value of the even-numbered-side hydraulic pressure detector 57 (step 121).

If it is YES in the determination (step 121), it proceeds to the abnormality diagnosis control (step 200). If it is NO in the determination (step 121), it is determined whether the second-speed/fourth-speed gear selection means 34 or the sixth-speed gear selection means 35 which are provided to the even-numbered intermediate shaft 8 is using, by the determination of whether the rotational speed of the even-numbered intermediate shaft 8 coincides with the synchronized rotational speed previously measured and stored in the data storage section 60 (step 122).

If it is YES in the determination (step 121), it proceeds to the abnormality diagnosis control (step 200). If it is NO in the determination (step 121), since the even-numbered clutch 10, the second-speed/fourth-speed gear selection means 34, and the sixth-speed gear selection means 35 are not used, it is determined that the even-numbered intermediate shaft 8 is not used, and an even-numbered intermediate shaft non-use flag Fe (Fe=Flag of even number side) is substituted by one (1) (step 123). Subsequently, it proceeds to the abnormality diagnosis control (step 200).

Figure 12:
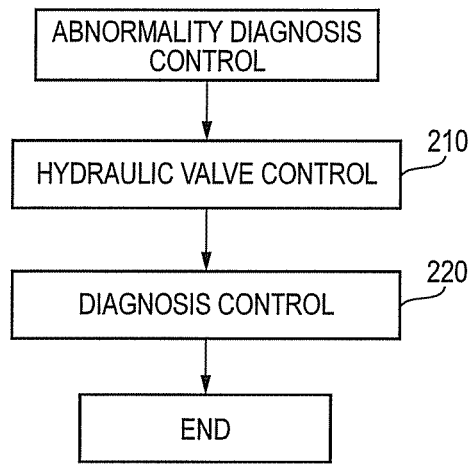
FIG. 12 is a flowchart of an abnormality diagnosis control according to the first embodiment.

In the abnormality diagnosis control (step 200), as illustrated in FIG. 12, the hydraulic valve control is performed (step 210), the diagnosis control is performed (step 220), and then the program ends.

Figure 13:
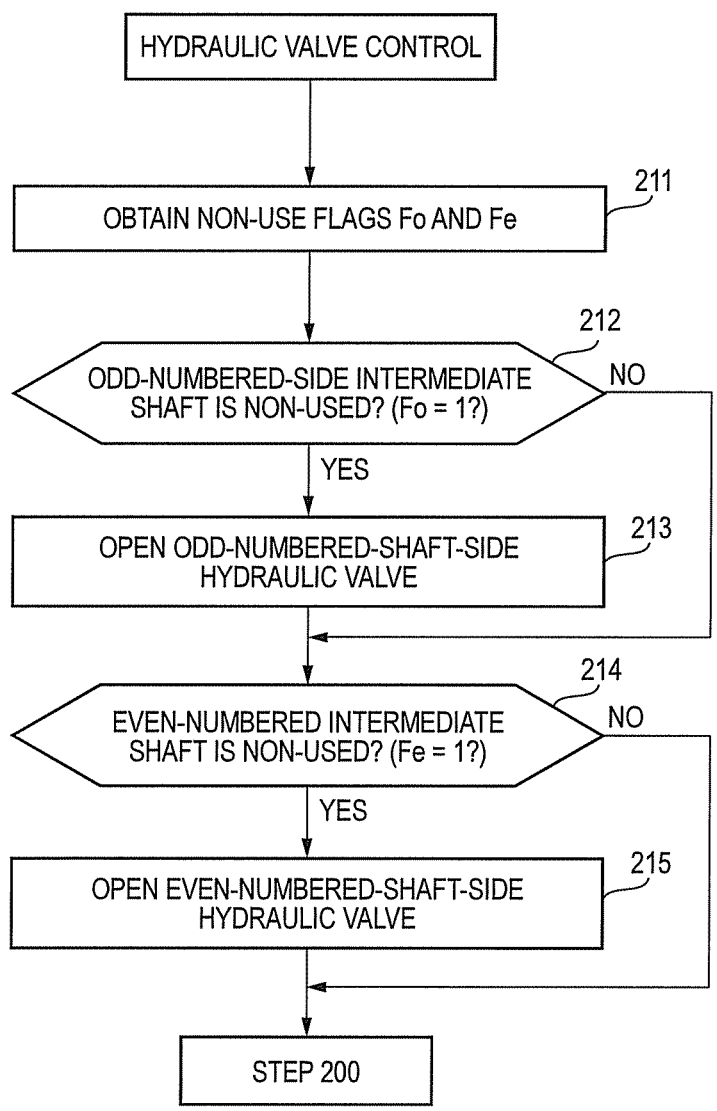
FIG. 13 is a flowchart of a hydraulic valve control according to the first embodiment.

In the hydraulic valve control (step 210), as illustrated in FIG. 13, the respective non-use flags Fo and Fe is obtained (step 211), and it is determined whether the odd-numbered intermediate shaft 7 is not used (Fo=1) (step 212).

If it is YES in the determination (step 212), the odd-numbered-shaft-side hydraulic valve 44 is opened (step 213), and it is determined whether the even-numbered intermediate shaft 8 is not used (Fe=1) (step 214). If it is NO in the determination (step 212), it proceeds to the determination (step 214) of whether the even-numbered intermediate shaft 8 is not used.

If it is YES in the determination (step 214), the even-numbered-shaft-side hydraulic valve 45 is opened (step 215), and it proceeds to the diagnosis control (step 220). If it is NO in the determination (step 214), it proceeds to the diagnosis control (step 220).

Figure 14:
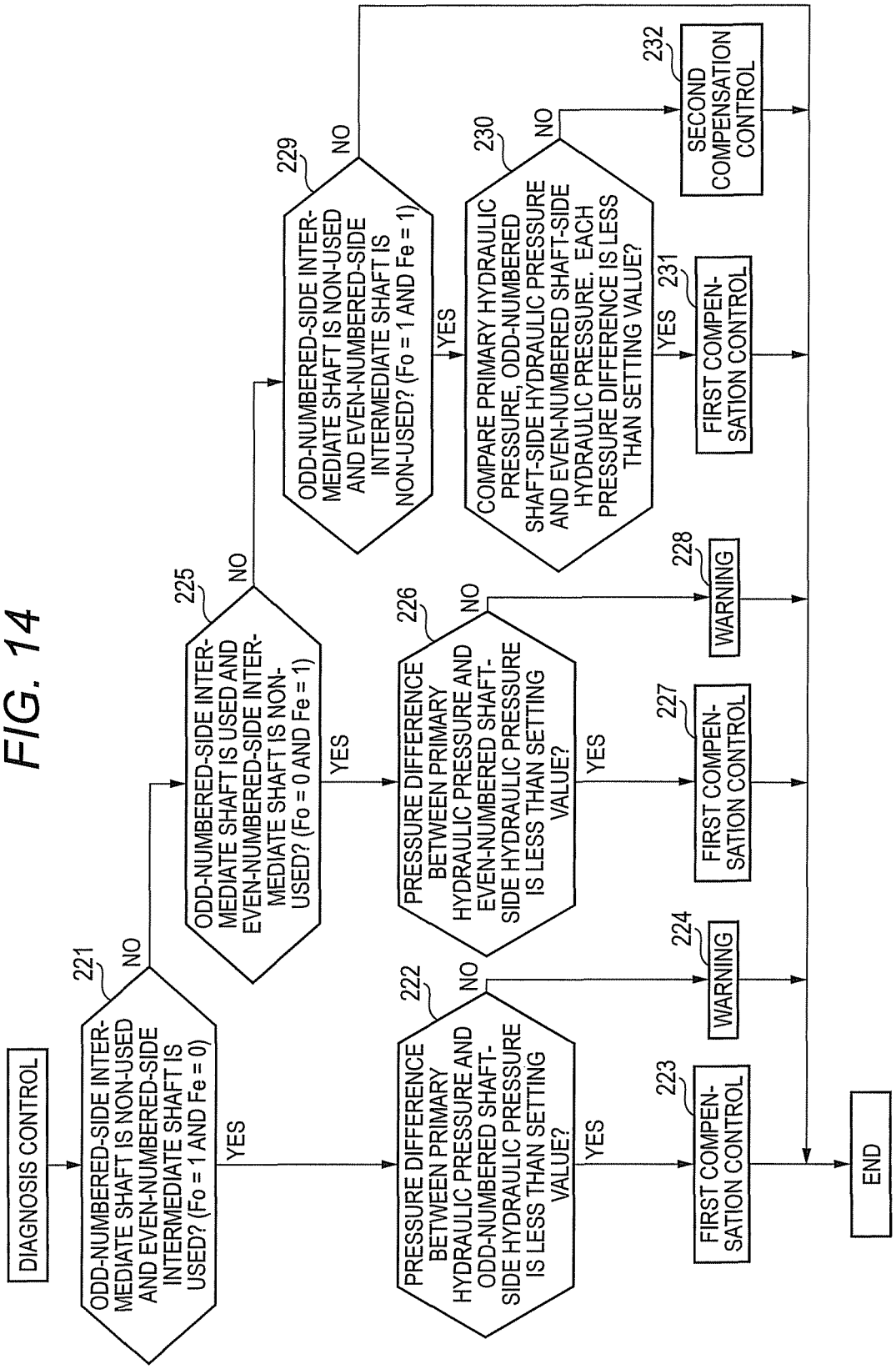
FIG. 14 is a flowchart of a diagnosis control according to the first embodiment.

In the diagnosis control (step 220), as illustrated in FIG. 14, it is determined whether the odd-numbered intermediate shaft 7 is not used, and the even-numbered intermediate shaft 8 is using (step 221).

If it is YES in the determination (step 221), it is determined whether a pressure difference between the primary hydraulic pressure detected by the primary hydraulic pressure detector 55 and the odd-numbered shaft-side hydraulic pressure detected by the odd-numbered hydraulic pressure detector 56 is less than a setting value (step 222).

If it is YES in the determination (step 222), the first compensation control is executed (step 223), and the program ends. If it is NO in the determination (step 222), it is determined as the abnormality, and the warning is performed (step 224). The program ends.

Figure 16:
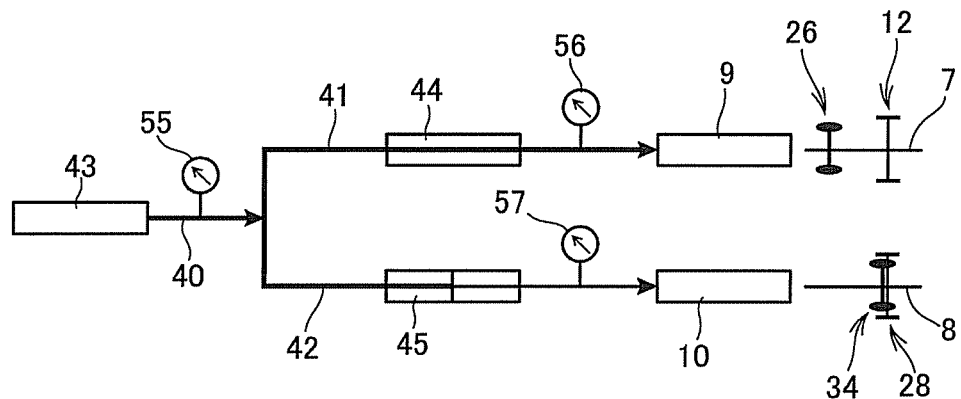
FIG. 16 is a hydraulic circuit diagram illustrating a hydraulic verification method during use of the even-numbered clutches according to the first embodiment.

In the hydraulic pressure determination (steps 221 and 222) when the even-numbered intermediate shaft 8 is not used, for example, as illustrated in FIG. 16, the even-numbered clutch 10 provided to the even-numbered intermediate shaft 8 is connected to the even-numbered intermediate shaft 8, and the second-speed/fourth-speed gear selection means 34 provided to the even-numbered intermediate shaft 8 is connected to the second-speed gear train 28. In this state, the odd-numbered-shaft-side hydraulic valve 44 of the odd-numbered clutch 9 is opened to the full open. If the odd-numbered-shaft-side hydraulic valve 44 is opened to the full open, the primary passage 40 and the odd-numbered-side branch passage 41 are subjected to the same pressure. Accordingly, by obtaining the pressure using the respective hydraulic pressure detectors 55 to 57 provided to the respective passages 40 to 42 and comparing each pressure, it is possible to determine the abnormality of the respective hydraulic pressure detectors 55 to 57.

In this instance, since the odd-numbered intermediate shaft 7 is connected to the odd-numbered clutch 9 at the full open of the odd-numbered-shaft-side hydraulic valve 44, the power of the engine 5 is transmitted to the odd-numbered intermediate shaft 7. However, since the first-speed/third-speed gear selection means 26 or the fifth-speed/reverse gear selection means 27 is not connected to the odd-numbered intermediate shaft 7, the power is not transmitted to the first-speed gear train 12, the third-speed gear train 13, the fifth-speed gear train 14, and the reverse gear train 15, so that the odd-numbered intermediate shaft 7 idles relative to the respective gear trains 12 to 15.

Figure 17:
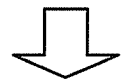
FIG. 17 is a view illustrating one example of a characteristic map of a hydraulic detector for use in a first compensation control according to the first embodiment.

Further, in the first compensation control (step 223), as illustrated in FIG. 17, the detected value (voltage) of the primary hydraulic pressure detector 55 is converted into a hydraulic pressure value with reference to the characteristic map of the primary hydraulic pressure detector 55 stored in the data storage section 60 to obtain the primary hydraulic pressure. The detected value of the odd-numbered-side hydraulic pressure detector 56 is converted into a hydraulic pressure value with reference to the characteristic map of the odd-numbered-side hydraulic pressure detector 56 stored in the data storage section 60 to obtain the odd-numbered-shaft-side hydraulic pressure. The obtained primary hydraulic pressure (e.g., p2) is compared with the odd-numbered-shaft-side hydraulic pressure (e.g., p'2), and if |p2−p'2|<setting value, the compensation is carried out by correcting the primary hydraulic pressure (e.g., p2) to be the odd-numbered-shaft-side hydraulic pressure (e.g., p'2).

In the first compensation control, the odd-numbered-shaft-side hydraulic pressure is compensated to the primary hydraulic pressure by changing the hydraulic pressure value of the characteristic map of the odd-numbered-side hydraulic pressure detector 56 stored in the data storage section 60.

If it is NO in the determination (step 221), it is determined whether the odd-numbered intermediate shaft 7 is using and the even-numbered intermediate shaft 8 is not used (step 225).

If it is YES in the determination (step 225), it is determined whether a pressure difference between the primary hydraulic pressure detected by the primary hydraulic pressure detector 55 and the even-numbered shaft-side hydraulic pressure detected by the even-numbered hydraulic pressure detector 57 is less than a setting value (step 226).

If it is YES in the determination (step 226), the first compensation control is executed (step 227), and the program ends. If it is NO in the determination (step 226), it is determined as the abnormality, and the warning is performed (step 228). The program ends.

Further, in the first compensation control (step 227), the compensation is carried out, like step 223. In this instance, if the pressure difference between the primary hydraulic pressure and the even-numbered-shaft-side hydraulic pressure is less than the setting value, the even-numbered-shaft-side hydraulic pressure is compensated to the primary hydraulic pressure.

If it is NO in the determination (step 225), it is determined whether the odd-numbered intermediate shaft 7 is not used, and the even-numbered intermediate shaft 8 is not used (step 229).

If it is YES in the determination (step 229), it is determined whether each pressure difference between the primary hydraulic pressure detected by the primary hydraulic pressure detector 55 and the odd-numbered shaft-side hydraulic pressure detected by the odd-numbered hydraulic pressure detector 56 or the even-numbered shaft-side hydraulic pressure detected by the even-numbered hydraulic pressure detector 57 is less than the setting value (step 230). If it is YES in the determination (step 230), the first compensation control is executed (step 231), and the program ends. If it is NO in the determination (step 230), the second compensation control is executed (step 232), and the program ends.

If it is NO in the determination (step 229), the program ends.

Figure 18:
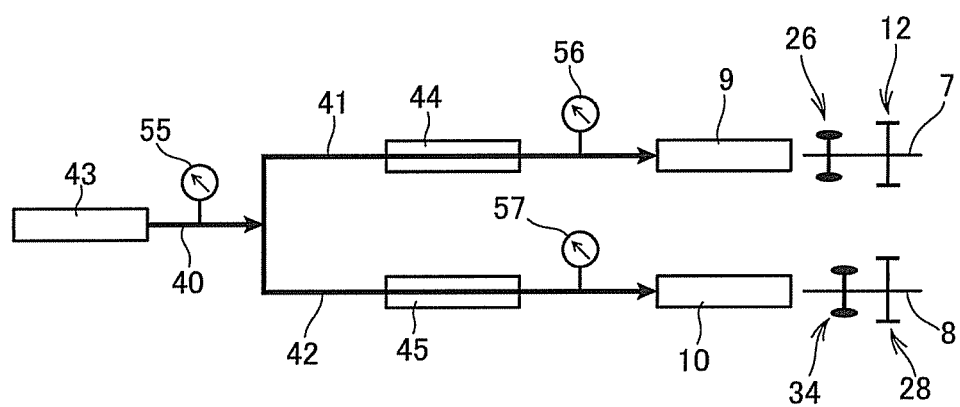
FIG. 18 is a hydraulic circuit diagram illustrating a hydraulic verification method during use of the odd-numbered clutches and the even-numbered clutches according to the first embodiment.
Figure 19:
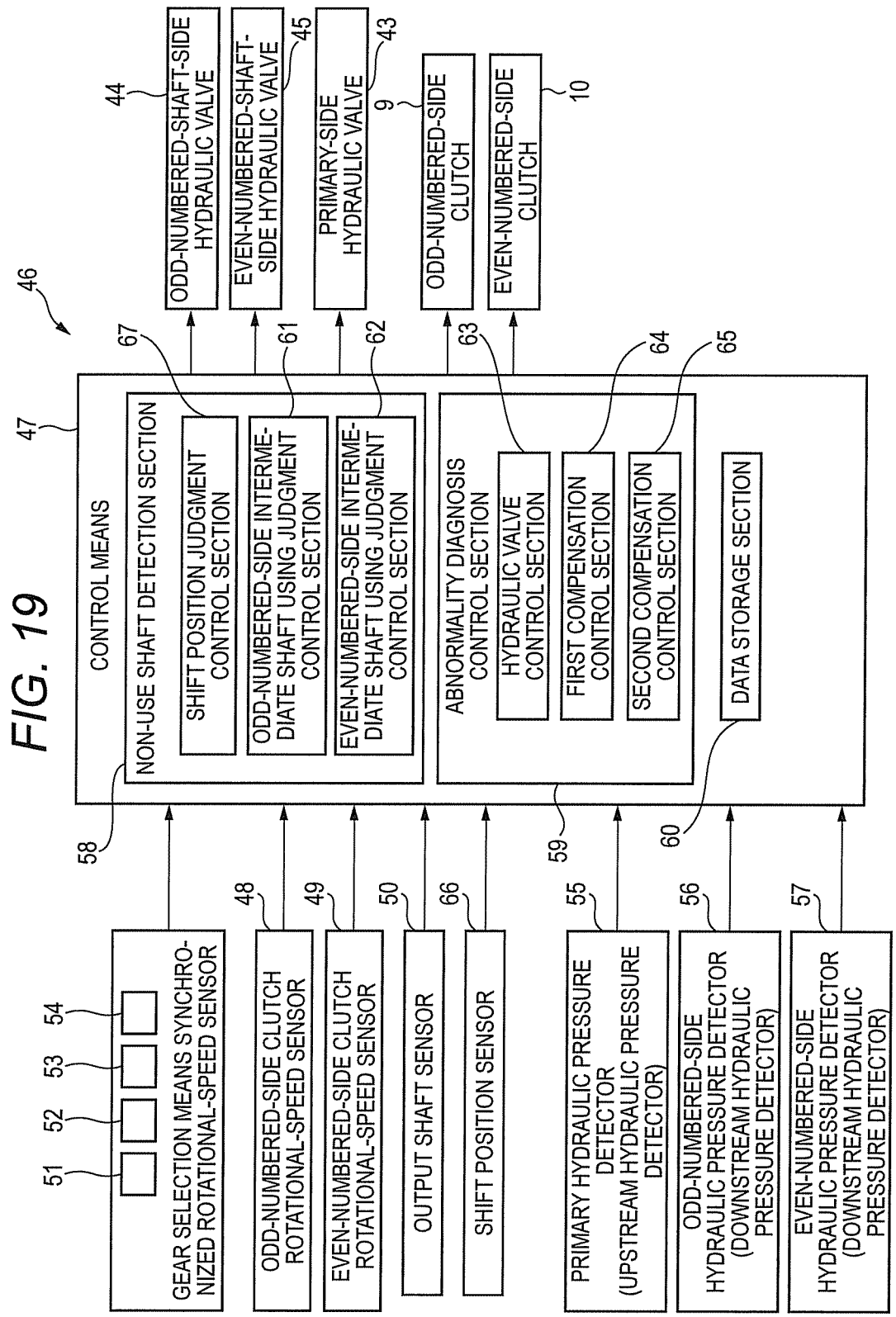
FIG. 19 is a system configuration diagram of a control device for a transmission according to a second embodiment.

In the hydraulic pressure determination (steps 229 and 230) when the odd-numbered intermediate shaft 7 is not used, for example, as illustrated in FIG. 18, the respective gear selection means 26 and 27 of the odd-numbered intermediate shaft 7 and the respective gear selection means 34 and 35 of the even-numbered intermediate shaft 8 are disconnected. In this state, the odd-numbered-shaft-side hydraulic valve 44 of the odd-numbered clutch 9 and the even-numbered-shaft-side hydraulic valve 45 of the even-numbered clutch 10 are opened to full open. Due to the full open of the odd-numbered-shaft-side hydraulic valve 44 and the even-numbered-shaft-side hydraulic valve 45, the primary passage 40, the odd-numbered-side branch passage 41, and the even-numbered-side branch passage 42 are subjected to the same pressure.

Accordingly, by obtaining the pressure using the primary hydraulic pressure detector 55, the odd-numbered-side hydraulic pressure detector 56, and the even-numbered-side hydraulic pressure detector 57 which are provided to the respective passages 40 to 42 and comparing each pressure, it is possible to determine the abnormality of the respective hydraulic pressure detectors 55 to 57.

In the comparing determination (step 230) of each pressure difference between the primary hydraulic pressure, and the odd-numbered-shaft-side hydraulic pressure and the even-numbered-shaft-side hydraulic pressure, it is possible to determine whether any one of the primary hydraulic pressure detector 55, the odd-numbered-side hydraulic pressure detector 56, and the even-numbered-side hydraulic pressure detector 57 is abnormal. For example, if the primary hydraulic pressure and the odd-numbered-shaft-side hydraulic pressure are equal to each, and the pressure difference between the primary hydraulic pressure and the even-numbered-shaft-side hydraulic pressure is the setting value or more, it can be determined that the even-numbered-side hydraulic pressure detector 57 is abnormal.

Further, in the first compensation control (step 231), the same compensation as the above-described step 223 is carried out. In this instance, the pressure difference between the primary hydraulic pressure and the odd-numbered-shaft-side hydraulic pressure is less than the setting value, and the pressure difference between the primary hydraulic pressure and the even-numbered-shaft-side hydraulic pressure is less than the setting value, both the odd-numbered-shaft-side hydraulic pressure and the even-numbered-shaft-side hydraulic pressure are respectively compensated to the primary hydraulic pressure.

Figure 15:
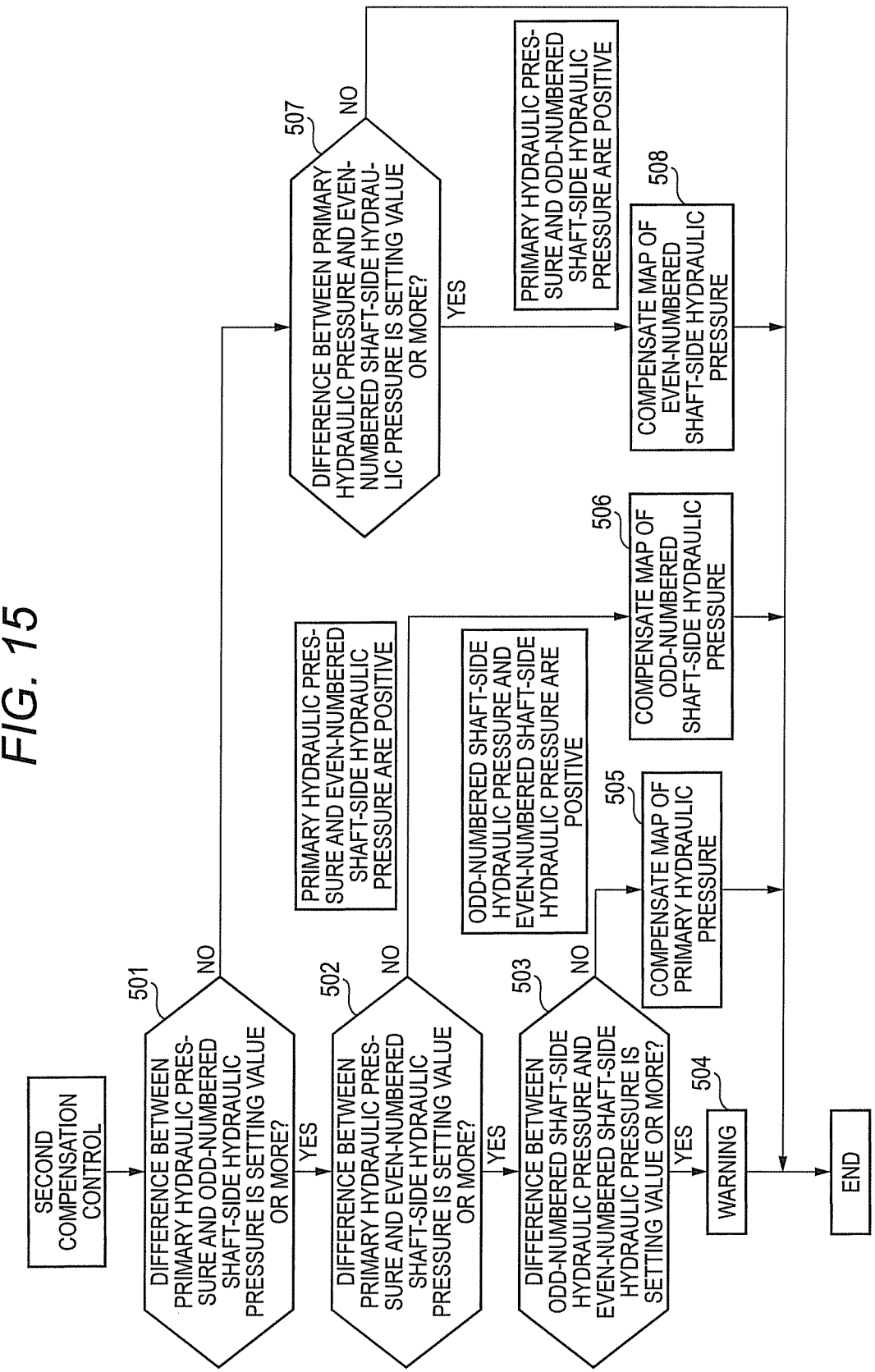
FIG. 15 is a flowchart of a second compensation control according to the first embodiment.

In addition, in the second compensation control (step 232), as illustrated in FIG. 15, it is determined whether the pressure difference between the primary hydraulic pressure and the odd-numbered-shaft-side hydraulic pressure is the setting value or more (step 501). If it is YES in the determination (step 501), it is determined whether the pressure difference between the primary hydraulic pressure and the even-numbered-shaft-side hydraulic pressure is the setting value or more (step 502). If it is YES in the determination (step 502), it is determined whether the pressure difference between the odd-numbered-shaft-side hydraulic pressure and the even-numbered-shaft-side hydraulic pressure is the setting value or more (step 503). If it is YES in the determination (step 503), it is determined as the abnormality, and the warning is performed (step 504). The program ends.

If it is NO in the determination (step 503), the odd-numbered-shaft-side hydraulic pressure and the even-numbered-shaft-side hydraulic pressure are positive values, and the hydraulic pressure value of the characteristic map of the primary hydraulic pressure detector 55 stored in the data storage section 60 is compensated (step 505). The program ends.

If it is NO in the determination (step 502), the primary hydraulic pressure and the even-numbered-shaft-side hydraulic pressure are compensated as a positive value, and the hydraulic pressure value of the characteristic map of the odd-numbered-side hydraulic pressure detector 56 stored in the data storage section 60 is compensated (step 506). The program ends.

Further, if it is NO in the determination (step 501), it is determined whether the pressure difference between the primary hydraulic pressure and the even-numbered-shaft-side hydraulic pressure is the setting value or more (step 507).

If it is YES in the determination (step 507), the primary hydraulic pressure and the odd-numbered-shaft-side hydraulic pressure are compensated as a positive value, and the hydraulic pressure value of the characteristic map of the even-numbered-side hydraulic pressure detector 57 stored in the data storage section 60 is compensated (step 508). The program ends.

If it is NO in the determination (step 507), the program ends.

Since the non-use shaft detection section 58 detects the non-use state of the odd-numbered intermediate shaft 7 and the even-numbered intermediate shaft 8 based on the transmission state of the odd-numbered clutch 9 and the even-numbered clutch 10, the control device 46 for the transmission 3 can accurately detect the non-use of the odd-numbered intermediate shaft 7 and the even-numbered intermediate shaft 8.

Further, with the transmission 3, if the power is transmitted from the odd-numbered input shaft 5 to the odd-numbered intermediate shaft 7, or is transmitted from the even-numbered input shaft 6 to the even-numbered intermediate shaft 8, according to the driving state of the vehicle 1, the first-speed gear train 12, the third-speed gear train 13, the fifth-speed gear train 14, reverse gear train 15, the second-speed gear train 28, the fourth-speed gear train 29, and the sixth-speed gear train 30 is selectively connected by any one of the first-speed/third-speed gear selection means 26, the fifth-speed/reverse gear selection means 27, the second-speed/fourth-speed gear selection means 34, and the sixth-speed gear selection means 35, thereby coupling the odd-numbered intermediate shaft 7 or the even-numbered intermediate shaft 8 to the output shaft 11.

That is, according to the transmission 3, if the transmission state of the respective gear selection means 26, 27, 34 and 35 is detected, it is possible to accurately detect the non-use of the odd-numbered intermediate shaft 7 and the even-numbered intermediate shaft 8, similar to the case where the transmission state of the odd-numbered clutch 9 and the even-numbered clutch 10 is detected.

Therefore, since the non-use shaft detection section 58 detects the non-use state of the odd-numbered intermediate shaft 7 and the even-numbered intermediate shaft 8 based on the transmission state of the respective gear selection means 26, 27, 34 and 35, the control device 46 for the transmission 3 can accurately detect the non-use of the odd-numbered intermediate shaft 7 and the even-numbered intermediate shaft 8.

Further, with the control device 46 for the transmission 3, the abnormality diagnosis control section 59 performs the abnormality diagnosis of the primary hydraulic pressure detector 55, the odd-numbered-side hydraulic pressure detector 56, and the even-numbered-side hydraulic pressure detector 57 according to the odd-numbered intermediate shaft 7 or the even-numbered intermediate shaft 8 which is determined as the non-use state by the non-use shaft detection section 58.

In this way, since the abnormality diagnosis is carried out after accurately determining the non-use state of the odd-numbered intermediate shaft 7 or the even-numbered intermediate shaft 8, the control device 46 for the transmission 3 can carry out the diagnosis with high accuracy. Further, since the diagnosis is carried out when odd-numbered intermediate shaft 7 or the even-numbered intermediate shaft 8 is not used, for example, even while the vehicle 1 is driving, the diagnosis frequency can be improved.

In addition, according to the control device 46 for the transmission 3, when the difference between the hydraulic pressure (primary hydraulic pressure) detected by the primary hydraulic pressure detector 55, and the hydraulic pressure (odd-numbered-shaft-side hydraulic pressure) detected by the odd-numbered-side hydraulic pressure detector 56 or the hydraulic pressure (even-numbered-shaft-side hydraulic pressure) detected by the even-numbered-side hydraulic pressure detector 57 is the setting value or the more, the abnormality is determined by the abnormality diagnosis control section 59.

The hydraulic pressure detected by the odd-numbered-side hydraulic pressure detector 56 according to the odd-numbered intermediate shaft 7 determined as the non-use state or the hydraulic pressure detected by the even-numbered-side hydraulic pressure detector 57 according to the even-numbered intermediate shaft 8 determined as the non-use state, and the hydraulic pressure detected by the primary hydraulic pressure detector 55 are subjected to the same pressure.

For this reason, the control device 46 for the transmission 3 can easily detect the abnormality by comparing the primary hydraulic pressure and the odd-numbered-shaft-side hydraulic pressure or the even-numbered-shaft-side hydraulic pressure, as described above. Further, with the configuration, the abnormality of the primary hydraulic pressure detector 55 can be detected, as well as the abnormality of the odd-numbered-side hydraulic pressure detector 56 and the even-numbered-side hydraulic pressure detector 57.

With the control device 46 for the transmission 3, when the difference between the primary hydraulic pressure detected by the primary hydraulic pressure detector 55 and the hydraulic pressure detected by the odd-numbered-side hydraulic pressure detector 56 or the even-numbered-side hydraulic pressure detector 57 is less than the setting value, the first compensation control section 64 of the abnormality diagnosis control section 59 compensates the hydraulic pressure of the odd-numbered-side hydraulic pressure detector 56 or the even-numbered-side hydraulic pressure detector 57 to the hydraulic pressure detected by the primary hydraulic pressure detector 55.

Since the control device 46 of the transmission 3 configured as described above can correct the error of the odd-numbered-side hydraulic pressure detector 56 and the even-numbered-side hydraulic pressure detector 57, the odd-numbered clutch 9 and the even-numbered clutch 10 can be always reliably controlled.

With the control device 46 for the transmission 3, when the difference between the primary hydraulic pressure detected by the primary hydraulic pressure detector 55 and the hydraulic pressure detected by the odd-numbered-side hydraulic pressure detector 56 or the even-numbered-side hydraulic pressure detector 57 is the setting value or more, the second compensation control section 65 of the abnormality diagnosis control section 59 compensates the hydraulic pressure detected by the primary hydraulic pressure detector 55, the odd-numbered-side hydraulic pressure detector 56 or the even-numbered-side hydraulic pressure detector 57, of which the pressure difference is the setting value or more, by any one of primary hydraulic pressure detector 55, the odd-numbered-side hydraulic pressure detector 56, and the even-numbered-side hydraulic pressure detector 57, of which the pressure difference is less than the setting value.

With the control device 46 for the transmission 3 configured as described above, in the case where the abnormality occurs at any one of the primary hydraulic pressure detector 55, the odd-numbered-side hydraulic pressure detector 56, and the even-numbered-side hydraulic pressure detector 57, the abnormal hydraulic pressure detector can be compensated to the hydraulic pressure of the normal hydraulic pressure detector, thereby carrying out the reliable clutch control even though the abnormal state happens.

Second Embodiment

FIGS. 19 to 28 show the second embodiment of the present invention. Since the transmission 3 according to the second embodiment has the same configuration as that of the transmission 3 according to the first embodiment, its detailed description will be made with reference to FIGS. 2 and 3.

With the control device 46 of the transmission 3 according to the second embodiment, the control means 47 is connected to the odd-numbered clutch 9, the even-numbered clutch 10, the primary-side hydraulic valve 43, the odd-numbered-shaft-side hydraulic valve 44, and the even-numbered-shaft-side hydraulic valve 45. The control means 47 adjusts an opening degree of the respective hydraulic valves 43 to 45 according to the shift position to change the transmission path of the transmission 3 and thus selectively connect the first-speed gear train 12, the third-speed gear train 13, the fifth-speed gear train 14, the reverse gear train 15, the second-speed gear train 28, the fourth-speed gear train 29, and the sixth-speed gear train 30, thereby performing the gear shifting of the transmission 3.

The control device 46 for the transmission 3 is connected to the odd-numbered-side clutch rotational-speed sensor 48, the even-numbered-side clutch rotational-speed sensor 49, the output shaft rotational-speed sensor 50, the first-speed/third-speed gear selection means synchronized rotational-speed sensor 51, the fifth-speed/reverse gear selection means synchronized rotational-speed sensor 52, the second-speed/fourth-speed gear selection means synchronized rotational-speed sensor 53, and the sixth-speed gear selection means synchronized rotational-speed sensor 54 to determine the non-use state of the odd-numbered intermediate shaft 7 and the even-numbered intermediate shaft 8. Further, the control means 47 is connected to the primary hydraulic pressure detector 55, the odd-numbered-side hydraulic detector 56 and the even-numbered-side hydraulic pressure detector 57 to perform the abnormality diagnosis or the compensation control.

These detectors 48 to 57 have the same configuration as those according to the first embodiment illustrated in FIG. 1, and thus the detailed description will be made with reference to FIG. 1.

In the control device 46 according to the second embodiment, the control means 47 is connected to a shift position sensor 66 provided to a shift knob, as a detector for detecting a shift position of the transmission 3. The control means 47 includes the non-use shaft detection section 58, the abnormality diagnosis control section 59, and the data storage section 60, which perform the control using the detected signals of the respective detectors 48 to 57 and 66.

The non-use shaft detection section 58 has the odd-numbered-side intermediate shaft using judgment control section 61, the even-numbered-side intermediate shaft using judgment control section 62, and a shift position judgment control section 67. The odd-numbered-side intermediate shaft using judgment control section 61 determines whether the odd-numbered intermediate shaft 7 is using, from the disengaged state of the odd-numbered clutch 9 and the engaged state of the respective gear trains 12 to 15. The even-numbered-side intermediate shaft using judgment control section 62 determines whether the even-numbered intermediate shaft 8 is using, from the disengaged state of the even-numbered clutch 10 and the engaged state of the respective gear trains 28 to 30.

From the judged results of the odd-numbered-side intermediate shaft using judgment control section 61, the even-numbered-side intermediate shaft using judgment control section 62, and the shift position judgment control section 67, the non-use shaft detection section 58 detects the non-use state of the odd-numbered intermediate shaft 7 and the even-numbered intermediate shaft 8 based on the transmission state of the odd-numbered clutch 9 and the even-numbered clutch 10, and the shift position of the transmission 3.

The abnormality diagnosis control section 59 performs the abnormality diagnosis of the primary hydraulic pressure detector 55, the odd-numbered-side hydraulic detector 56, and the even-numbered-side hydraulic pressure detector 57 which are hydraulic pressure detectors according to the odd-numbered intermediate shaft 7 or the even-numbered intermediate shaft 8 which is judged as the non-use state by the non-use shaft detection section 58 having the odd-numbered-side intermediate shaft using judgment control section 61, the even-numbered-side intermediate shaft using judgment control section 62, and the shift position judgment control section 67. The primary hydraulic pressure detector 55, the odd-numbered-side hydraulic detector 56, and the even-numbered-side hydraulic pressure detector 57 detect the hydraulic pressure of the oil for use in the operation of the odd-numbered clutch 9 and the even-numbered clutch 10.

Further, the abnormality diagnosis control section 59 judges the abnormality when the hydraulic pressure (primary hydraulic pressure) detected by the primary hydraulic pressure detector 55 which is the upstream hydraulic pressure detector, the hydraulic pressure (odd-numbered-shaft-side hydraulic pressure) detected by the odd-numbered-side hydraulic detector 56, or the even-numbered intermediate shaft 8 or the hydraulic pressure (even-numbered-shaft-side hydraulic pressure) detected by the even-numbered-side hydraulic pressure detector 57, which are at least two downstream hydraulic pressure detectors judged as the non-use state is the setting value or more.

In addition, the abnormality diagnosis control section 59 has the hydraulic valve control section 63, the first compensation control section 64, and the second compensation control section 65. The hydraulic valve control section 63 opens the odd-numbered-shaft-side hydraulic valve 44 and/or the even-numbered-shaft-side hydraulic valve 45 based on the detected results of the non-use shaft detection section 58, thereby enabling the oil for diagnosis to flow through the odd-numbered-side branch passage 41 and/or the even-numbered-side branch passage 42.

The first compensation control section 64 compensates the hydraulic pressure of the odd-numbered-side hydraulic detector 56 or the even-numbered-side hydraulic pressure detector 57 to the hydraulic pressure detected by the primary hydraulic pressure detector 55, when the difference between the hydraulic pressure detected by the primary hydraulic pressure detector 55 and the hydraulic pressure detected by the odd-numbered-side hydraulic detector 56 or the even-numbered-side hydraulic pressure detector 57 is less than the setting value.

When the difference between the hydraulic pressure detected by the primary hydraulic pressure detector 55 and the hydraulic pressure detected by the odd-numbered-side hydraulic detector 56 or the even-numbered-side hydraulic pressure detector 57 is the setting value or more, that is, when it is judged as the abnormality, the second compensation control section 65 compensates the hydraulic pressure detected by the primary hydraulic pressure detector 55, the odd-numbered-side hydraulic detector 56, or the even-numbered-side hydraulic pressure detector 57, of which the difference of the hydraulic pressure is the setting value or more, by any one of the primary hydraulic pressure detector 55, the odd-numbered-side hydraulic detector 56, and the even-numbered-side hydraulic pressure detector 57, of which the difference of the hydraulic pressure is less than the setting value.

The data storage section 60 is stored with the synchronized rotational speed of the first-speed/third-speed gear selection means 26, the fifth-speed/reverse gear selection means 27, the second-speed/fourth-speed gear selection means 34, and the sixth-speed gear selection means 35. The synchronized rotational speed stored in the data storage section 60 is used for the non-use judgment of the odd-numbered intermediate shaft 7 and the even-numbered intermediate shaft 8 by the non-use shaft detection section 58.

Further, the data storage section 60 is stored with a characteristic map of the respective hydraulic pressure detectors 55 to 57. The characteristic map of the respective hydraulic pressure detectors 55 to 57 stored in the data storage section 60 is used for the abnormality judgment of the respective hydraulic pressure detectors 55 to 57 by the abnormality diagnosis control section 59.

Next, the operation of the second embodiment will be described.

Figure 20:
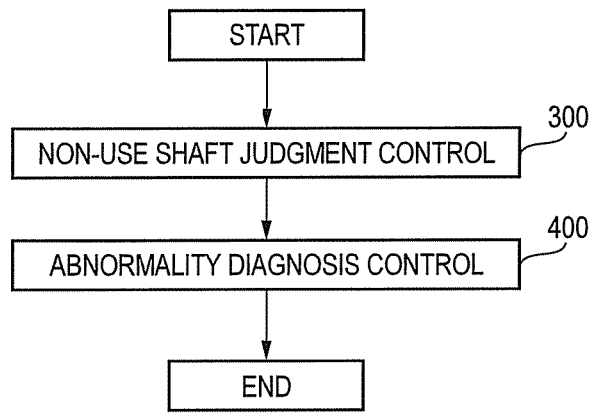
FIG. 20 is a main flowchart of the control device according to the second embodiment.

If the control program starts, as illustrated in FIG. 20, the control device 46 for the transmission 3 performs the non-use shaft judgment control (step 300), and performs the abnormality diagnosis control (step 400), and then the program ends. The control is repeatedly executed at given time intervals. If electricity is supplied to the control device 46, the control is executed irrespective of the start state of the engine 2.

Figure 21:
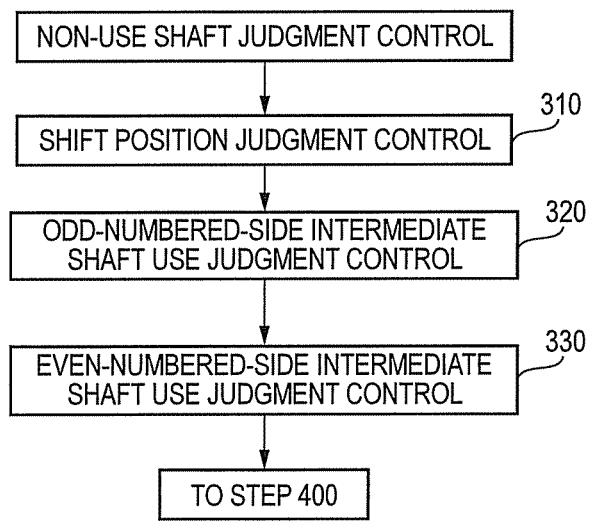
FIG. 21 is a flowchart of a non-used shaft judgment control according to the second embodiment.

In the non-use shaft judgment control (step 300), as illustrated in FIG. 21, the shift position judgment control is performed (step 310), the odd-numbered-side intermediate shaft using judgment control is performed (step 320), the even-numbered-side intermediate shaft using judgment control is performed (step 330), and it proceeds to the abnormality diagnosis control (step 400).

Figure 22:
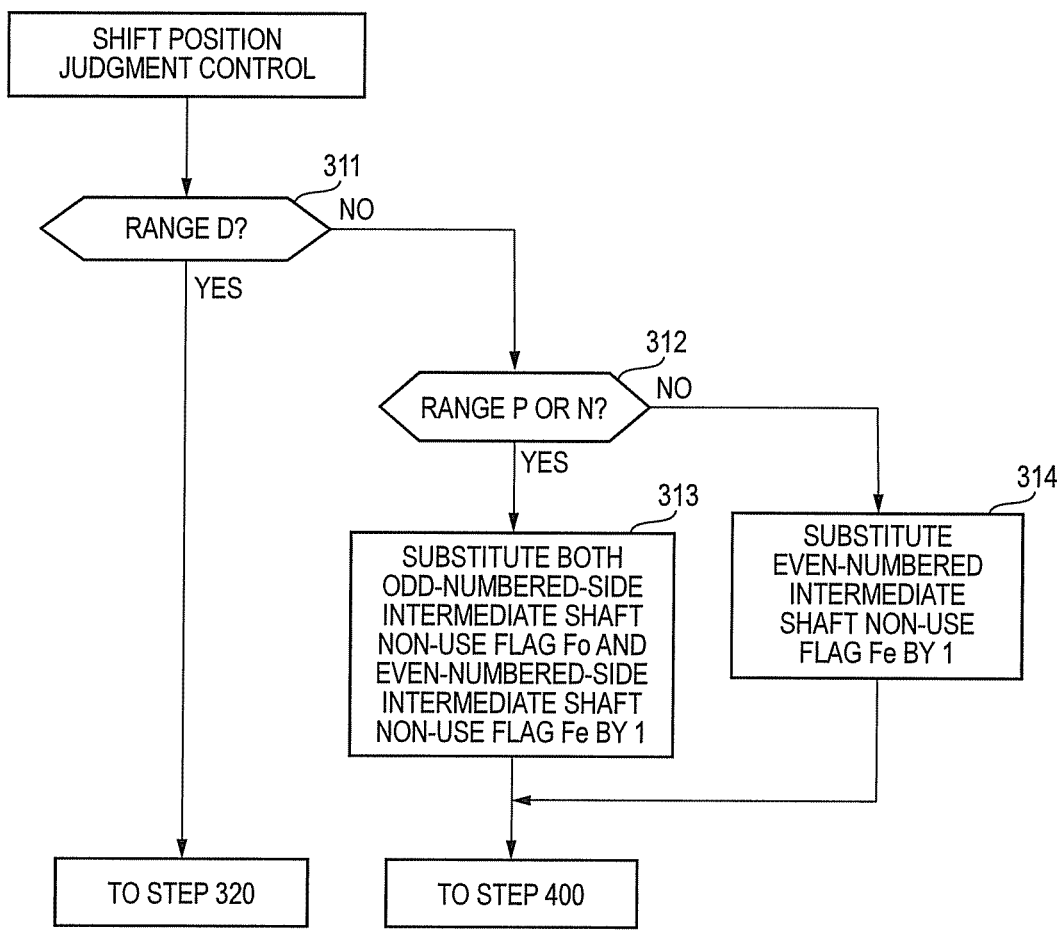
FIG. 22 is a flowchart of a shift position judgment control according to the second embodiment.

In the shift position judgment control (step 310), as illustrated in FIG. 22, it is determined whether the shift position in a drive range (range D), based on the detected value of the shift position sensor 66 (step 311).

If it is YES in the determination (step 311), it proceeds to the odd-numbered-side intermediate shaft using judgment control (step 320). If it is NO in the determination (step 311), it is determined whether the shift position is in a parking range (range P) or a neutral range (range N), based on the detected value of the shift position sensor 66 (step 312).

If it is YES in the determination (step 312), both the odd-numbered intermediate shaft non-use flag Fo (Fo=Flag of odd number side) and the even-numbered intermediate shaft non-use flag Fe (Fe=Flag of even number side) are substituted by one (1) (step 313), and it proceeds to the abnormality diagnosis control (step 400).

If it is NO in the determination (step 312), it is determined that the shift position is in the reverse range (range R), and the even-numbered intermediate shaft non-use flag Fe is substituted by one (1) (step 314). It proceeds to the abnormality diagnosis control (step 400).

Figure 23:
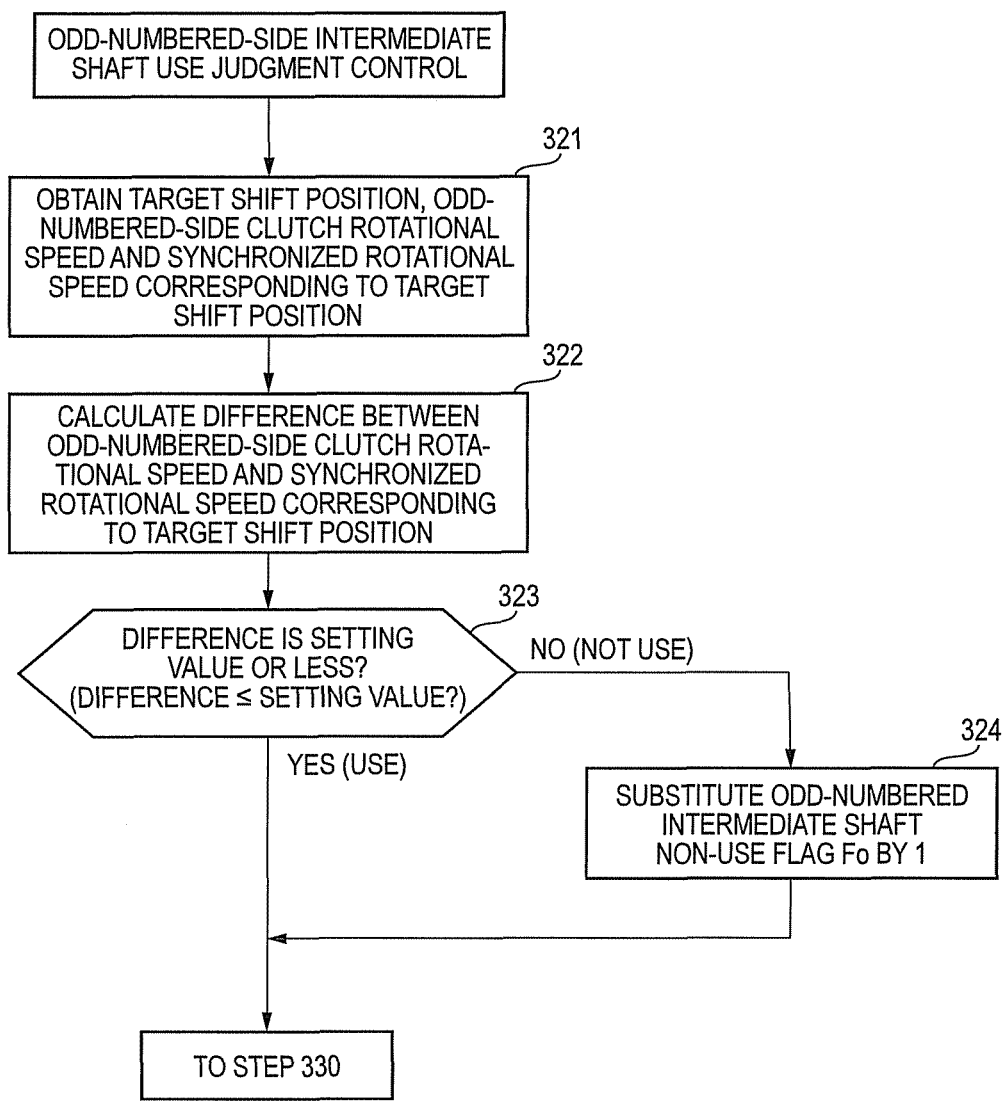
FIG. 23 is a flowchart of an odd-numbered intermediate shaft using judgment control according to the second embodiment.

In the odd-numbered-side intermediate shaft using judgment control (step 320), as illustrated in FIG. 23, a target shift position, an odd-numbered-side clutch rotational speed, and a synchronized rotational speed corresponding to the target shift position are obtained (step 321), and a difference between the odd-numbered-side clutch rotational speed and the synchronized rotational speed corresponding to the target shift position is obtained (step 322). Then, it is determined whether the difference is less than a setting value (difference≤setting value) (step 323).

In the obtaining of the target shift position and the synchronized rotational speed (321), the target shift position means a shift position of the transmission 3 which is determined by the control device 46 according to the driving state of the vehicle 1. For example, in a case where the control device 46 shifts the gears from the second speed to the third speed based on the engine rotational speed of the engine 2 and an engine load, the third speed becomes the target shift position.

If it is YES in the determination (step 323), it proceeds to the even-numbered-side intermediate shaft using judgment control (330). If it is NO in the determination (step 323), it is determined that the odd-numbered intermediate shaft 7 is not used, and the odd-numbered intermediate shaft non-use flag Fo is substituted by one (1) (step 324). Then, it proceeds to the even-numbered-side intermediate shaft using judgment control (330).

Figure 24:
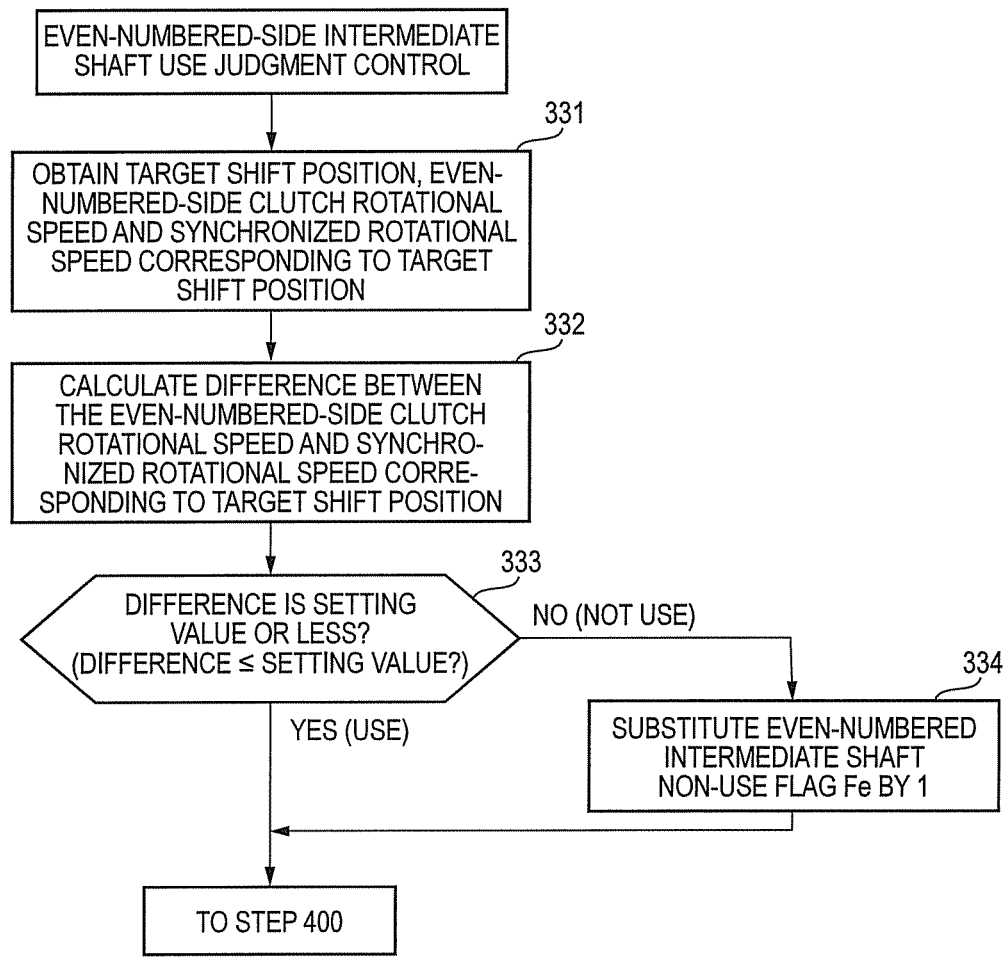
FIG. 24 is a flowchart of an even-numbered intermediate shaft using judgment control according to the second embodiment.

In the even-numbered-side intermediate shaft using judgment control (330), as illustrated in FIG. 24, the target shift position, an even-numbered-side clutch rotational speed, and a synchronized rotational speed corresponding to the target shift position are obtained (step 331), and a difference between the even-numbered-side clutch rotational speed and the synchronized rotational speed corresponding to the target shift position is obtained (step 332). Then, it is determined whether the difference is less than the setting value (difference≤setting value) (step 333).

If it is YES in the determination (step 333), it proceeds to the abnormality diagnosis control (step 400). If it is NO in the determination (step 333), it is determined that the even-numbered intermediate shaft 8 is not used, and the even-numbered intermediate shaft non-use flag Fe is substituted by one (1) (step 334). Then, it proceeds to the abnormality diagnosis control (400).

Figure 25:
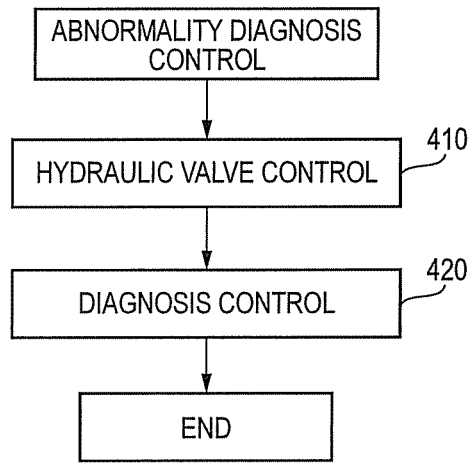
FIG. 25 is a flowchart of an abnormality diagnosis control according to the second embodiment.

The abnormality diagnosis control (step 400) is identical to that according to the first embodiment. In the abnormality diagnosis control (step 400), as illustrated in FIG. 25, the hydraulic valve control is performed (step 410), the diagnosis control is performed (step 420), and then the program ends.

Figure 26:
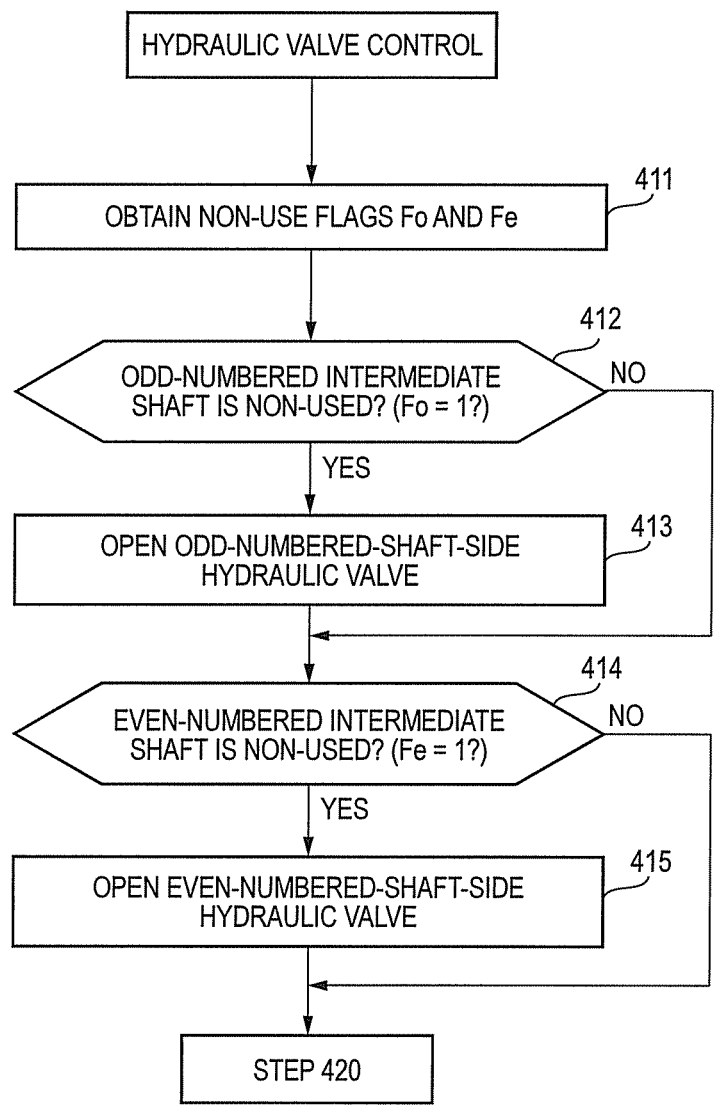
FIG. 26 is a flowchart of a hydraulic valve control according to the second embodiment.

In the hydraulic valve control (step 410), as illustrated in FIG. 26, the respective non-use flags Fo and Fe is obtained (step 411), and it is determined whether the odd-numbered intermediate shaft 7 is not used (Fo=1) (step 412).

If it is YES in the determination (step 412), the odd-numbered-shaft-side hydraulic valve 44 is opened (step 413), and it is determined whether the even-numbered intermediate shaft 8 is not used (Fe=1) (step 414). If it is NO in the determination (step 412), it proceeds to the determination (step 414) of whether the even-numbered intermediate shaft 8 is not used.

If it is YES in the determination (step 414), the even-numbered-shaft-side hydraulic valve 45 is opened (step 415), and it proceeds to the diagnosis control (step 420). If it is NO in the determination (step 414), it proceeds to the diagnosis control (step 420).

Figure 27:
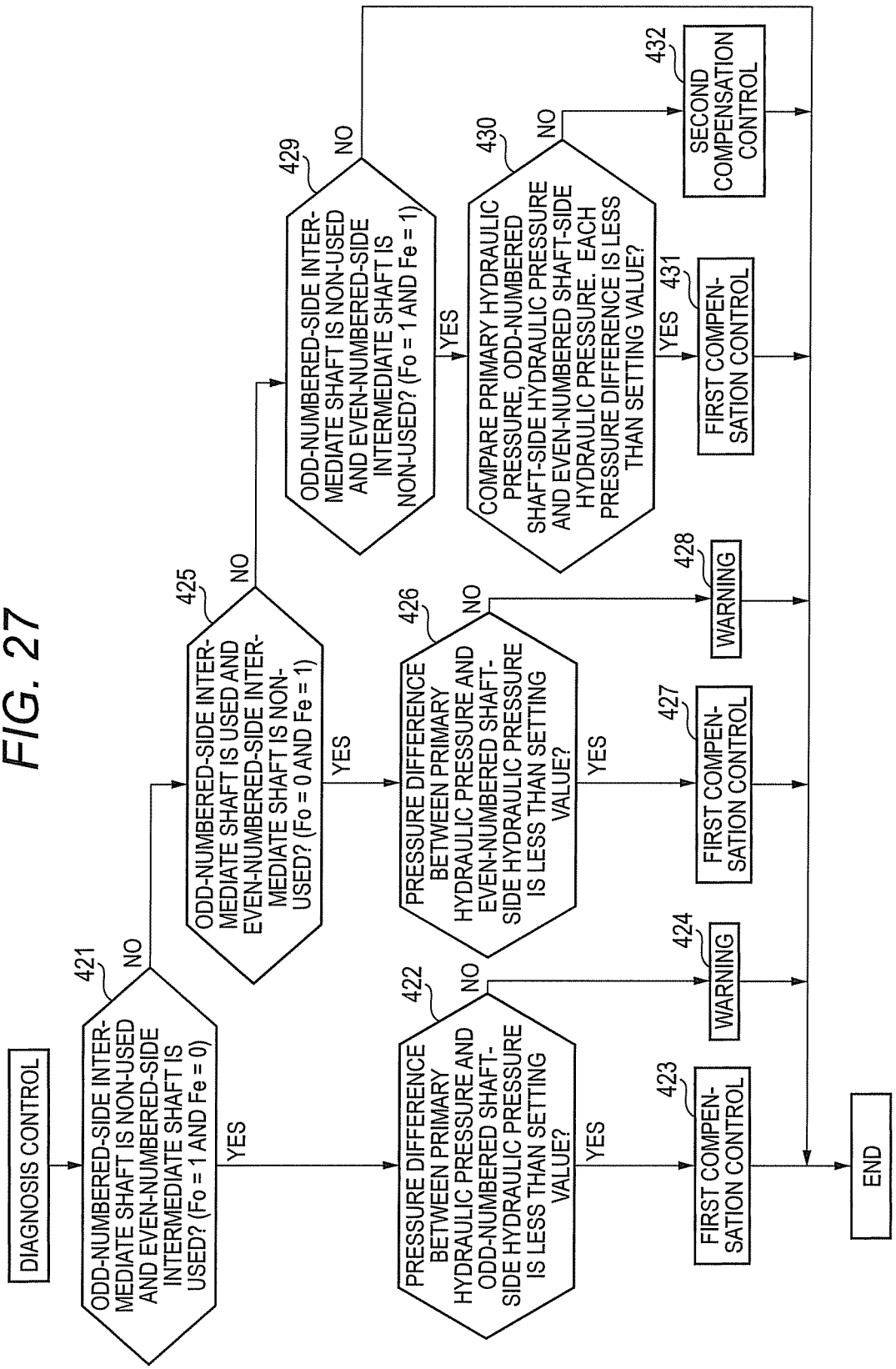
FIG. 27 is a flowchart of a diagnosis control according to the second embodiment.

In the diagnosis control (step 420), as illustrated in FIG. 27, it is determined whether the odd-numbered intermediate shaft 7 is not used, and the even-numbered intermediate shaft 8 is using (step 421).

If it is YES in the determination (step 421), it is determined whether a pressure difference between the primary hydraulic pressure detected by the primary hydraulic pressure detector 55 and the odd-numbered shaft-side hydraulic pressure detected by the odd-numbered hydraulic pressure detector 56 is less than a setting value (step 422).

If it is YES in the determination (step 422), the first compensation control is executed (step 423), and the program ends. If it is NO in the determination (step 422), it is determined as the abnormality, and the warning is performed (step 424). The program ends.

In the hydraulic pressure determination (steps 421 and 422) when the even-numbered intermediate shaft 8 is not used, for example, as illustrated in FIG. 16, the even-numbered clutch 10 provided to the even-numbered intermediate shaft 8 is connected to the even-numbered intermediate shaft 8, and the second-speed/fourth-speed gear selection means 34 provided to the even-numbered intermediate shaft 8 is connected to the second-speed gear train 28. In this state, the odd-numbered-shaft-side hydraulic valve 44 of the odd-numbered clutch 9 is opened to the full open. If the odd-numbered-shaft-side hydraulic valve 44 is opened to the full open, the primary passage 40 and the odd-numbered-side branch passage 41 are subjected to the same pressure. Accordingly, by obtaining the pressure using the respective hydraulic pressure detectors 55 to 57 provided to the respective passages 40 to 42 and comparing each pressure, it is possible to determine the abnormality of the respective hydraulic pressure detectors 55 to 57. In this instance, since the odd-numbered intermediate shaft 7 is connected to the odd-numbered clutch 9 at the full open of the odd-numbered-shaft-side hydraulic valve 44, the power of the engine 5 is transmitted to the odd-numbered intermediate shaft 7. However, since the first-speed/third-speed gear selection means 26 or the fifth-speed/reverse gear selection means 27 is not connected to the odd-numbered intermediate shaft 7, the power is not transmitted to the first-speed gear train 12, the third-speed gear train 13, the fifth-speed gear train 14, and the reverse gear train 15, so that the odd-numbered intermediate shaft 7 idles relative to the respective gear trains 12 to 15.

Further, in the first compensation control (step 423), as illustrated in FIG. 17, the detected value (voltage) of the primary hydraulic pressure detector 55 is converted into a hydraulic pressure value with reference to the characteristic map of the primary hydraulic pressure detector 55 stored in the data storage section 60 to obtain the primary hydraulic pressure. The detected value of the odd-numbered-side hydraulic pressure detector 56 is converted into a hydraulic pressure value with reference to the characteristic map of the odd-numbered-side hydraulic pressure detector 56 stored in the data storage section 60 to obtain the odd-numbered-shaft-side hydraulic pressure. The obtained primary hydraulic pressure (e.g., p2) is compared with the odd-numbered-shaft-side hydraulic pressure (e.g., p'2), and if |p2−p'2|<setting value, the compensation is carried out by adding the primary hydraulic pressure (e.g., p2) to the odd-numbered-shaft-side hydraulic pressure (e.g., p2).

In the first compensation control, the odd-numbered-shaft-side hydraulic pressure is compensated to the primary hydraulic pressure by changing the hydraulic pressure value of the characteristic map of the odd-numbered-side hydraulic pressure detector 56 stored in the data storage section 60.

If it is NO in the determination (step 421), it is determined whether the odd-numbered intermediate shaft 7 is using and the even-numbered intermediate shaft 8 is not used (step 425).

If it is YES in the determination (step 425), it is determined whether a pressure difference between the primary hydraulic pressure detected by the primary hydraulic pressure detector 55 and the even-numbered shaft-side hydraulic pressure detected by the even-numbered hydraulic pressure detector 57 is less than a setting value (step 426).

If it is YES in the determination (step 426), the first compensation control is executed (step 427), and the program ends. If it is NO in the determination (step 426), it is determined as the abnormality, and the warning is performed (step 428). The program ends.

Further, in the first compensation control (step 427), the compensation is carried out, like step 423. In this instance, if the pressure difference between the primary hydraulic pressure and the even-numbered-shaft-side hydraulic pressure is less than the setting value, the even-numbered-shaft-side hydraulic pressure is compensated to the primary hydraulic pressure.

If it is NO in the determination (step 425), it is determined whether the odd-numbered intermediate shaft 7 is not used, and the even-numbered intermediate shaft 8 is not used (step 429).

If it is YES in the determination (step 429), it is determined whether each pressure difference between the primary hydraulic pressure detected by the primary hydraulic pressure detector 55 and the odd-numbered shaft-side hydraulic pressure detected by the odd-numbered hydraulic pressure detector 56 or the even-numbered shaft-side hydraulic pressure detected by the even-numbered hydraulic pressure detector 57 is less than the setting value (step 430).

If it is YES in the determination (step 430), the first compensation control is executed (step 431), and the program ends. If it is NO in the determination (step 430), the second compensation control is executed (step 432), and the program ends.

If it is NO in the determination (step 429), the program ends.

In the hydraulic pressure determination (steps 429 and 430) when the odd-numbered intermediate shaft 7 is not used, for example, as illustrated in FIG. 18, the respective gear selection means 26 and 27 of the odd-numbered intermediate shaft 7 and the respective gear selection means 34 and 35 of the even-numbered intermediate shaft 8 are disconnected. In this state, the odd-numbered-shaft-side hydraulic valve 44 of the odd-numbered clutch 9 and the even-numbered-shaft-side hydraulic valve 45 of the even-numbered clutch 10 are opened to full open. Due to the full open of the odd-numbered-shaft-side hydraulic valve 44 and the even-numbered-shaft-side hydraulic valve 45, the primary passage 40, the odd-numbered-side branch passage 41, and the even-numbered-side branch passage 42 are subjected to the same pressure.

Accordingly, by obtaining the pressure using the primary hydraulic pressure detector 55, the odd-numbered-side hydraulic pressure detector 56, and the even-numbered-side hydraulic pressure detector 57 which are provided to the respective passages 40 to 42 and comparing each pressure, it is possible to determine the abnormality of the respective hydraulic pressure detectors 55 to 57.

In the comparing determination (step 430) of each pressure difference between the primary hydraulic pressure, and the odd-numbered-shaft-side hydraulic pressure and the even-numbered-shaft-side hydraulic pressure, it is possible to determine whether any one of the primary hydraulic pressure detector 55, the odd-numbered-side hydraulic pressure detector 56, and the even-numbered-side hydraulic pressure detector 57 is abnormal. For example, if the primary hydraulic pressure and the odd-numbered-shaft-side hydraulic pressure are equal to each, and the pressure difference between the primary hydraulic pressure and the even-numbered-shaft-side hydraulic pressure is the setting value or more, it can be determined that the even-numbered-side hydraulic pressure detector 57 is abnormal.

Further, if the first compensation control (step 431), the same compensation as the above-described step 423 is carried out. In this instance, the pressure difference between the primary hydraulic pressure and the odd-numbered-shaft-side hydraulic pressure is less than the setting value, and the pressure difference between the primary hydraulic pressure and the even-numbered-shaft-side hydraulic pressure is less than the setting value, both the odd-numbered-shaft-side hydraulic pressure and the even-numbered-shaft-side hydraulic pressure are respectively compensated to the primary hydraulic pressure.

Figure 28:
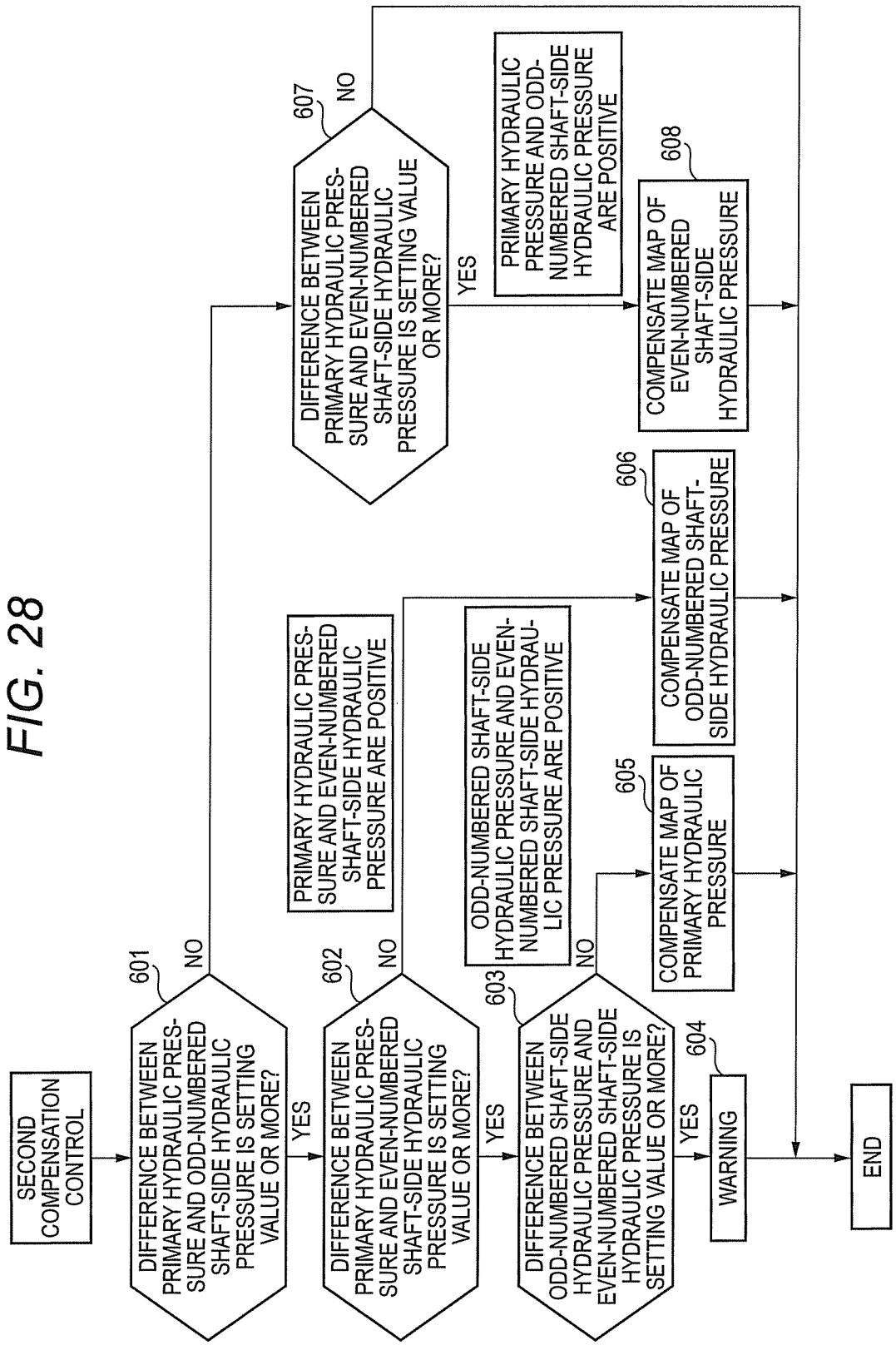
FIG. 28 is a flowchart of a second compensation control according to the second embodiment.

In addition, in the second compensation control (step 432), as illustrated in FIG. 28, it is determined whether the pressure difference between the primary hydraulic pressure and the odd-numbered-shaft-side hydraulic pressure is the setting value or more (step 601). If it is YES in the determination (step 601), it is determined whether the pressure difference between the primary hydraulic pressure and the even-numbered-shaft-side hydraulic pressure is the setting value or more (step 602). If it is YES in the determination (step 602), it is determined whether the pressure difference between the odd-numbered-shaft-side hydraulic pressure and the even-numbered-shaft-side hydraulic pressure is the setting value or more (step 603). If it is YES in the determination (step 603), it is determined as the abnormality, and the warning is performed (step 604). The program ends.

If it is NO in the determination (step 603), the odd-numbered-shaft-side hydraulic pressure and the even-numbered-shaft-side hydraulic pressure are compensated as a positive value, and the hydraulic pressure value of the characteristic map of the primary hydraulic pressure detector 55 stored in the data storage section 60 is compensated (step 605). The program ends.

If it is NO in the determination (step 602), the primary hydraulic pressure and the even-numbered-shaft-side hydraulic pressure are compensated as a positive value, and the hydraulic pressure value of the characteristic map of the odd-numbered-side hydraulic pressure detector 56 stored in the data storage section 60 is compensated (step 606). The program ends.

Further, if it is NO in the determination (step 601), it is determined whether the pressure difference between the primary hydraulic pressure and the even-numbered-shaft-side hydraulic pressure is the setting value or more (step 607).

If it is YES in the determination (step 607), the primary hydraulic pressure and the odd-numbered-shaft-side hydraulic pressure are compensated as a positive value, and the hydraulic pressure value of the characteristic map of the even-numbered-side hydraulic pressure detector 57 stored in the data storage section 60 is compensated (step 608). The program ends. If it is NO in the determination (step 607), the program ends.

With the control device 46 for the transmission 3, since the non-use shaft detection section 58 detects the non-use state of the odd-numbered intermediate shaft 7 and the even-numbered intermediate shaft 8 based on the shift position of the transmission 3, it is possible to accurately detect the non-use of the odd-numbered intermediate shaft 7 and the even-numbered intermediate shaft 8.

With the configuration, it is possible to detect the non-use shaft based on the shift position. Since the shift position can be detected by use of the shift position sensor 66, it is possible to accurately detect the non-use shaft according to the manipulation of the driver. Further, since the operation of the driver is detected, the configuration can quickly perform the judgment, as compared with the case of detecting the operation of the odd-numbered clutch 9, the even-numbered clutch 10, the first-speed/third-speed gear selection means 26, the fifth-speed/reverse gear selection means 27, the second-speed/fourth-speed gear selection means 34 or the sixth-speed gear selection means 35.

Further, since the non-use shaft detection section 58 detects the non-use state of the odd-numbered intermediate shaft 7 and the even-numbered intermediate shaft 8 based on the transmission state of the odd-numbered clutch 9 and the even-numbered clutch 10, the control device 46 for the transmission 3 can accurately detect the non-use of the odd-numbered intermediate shaft 7 and the even-numbered intermediate shaft 8.

In addition, since the non-use shaft detection section 58 detects the non-use state of the odd-numbered intermediate shaft 7 and the even-numbered intermediate shaft 8 based on the transmission state of the respective gear selection means 26, 27, 34 and 35, the control device 46 for the transmission 3 can accurately detect the non-use of the odd-numbered intermediate shaft 7 and the even-numbered intermediate shaft 8.

Further, with the control device 46 for the transmission 3, the abnormality diagnosis control section 59 performs the abnormality diagnosis of the primary hydraulic pressure detector 55, the odd-numbered-side hydraulic pressure detector 56, and the even-numbered-side hydraulic pressure detector 57 according to the odd-numbered intermediate shaft 7 or the even-numbered intermediate shaft 8 which is determined as the non-use state by the non-use shaft detection section 58.

In this way, since the abnormality diagnosis is carried out after accurately determining the non-use state of the odd-numbered intermediate shaft 7 or the even-numbered intermediate shaft 8, the control device 46 for the transmission 3 can carry out the diagnosis with high accuracy. Further, since the diagnosis is carried out when odd-numbered intermediate shaft 7 or the even-numbered intermediate shaft 8 is not used, for example, even while the vehicle 1 is driving, the diagnosis frequency can be improved.

In addition, according to the control device 46 for the transmission 3, when the difference between the hydraulic pressure (primary hydraulic pressure) detected by the primary hydraulic pressure detector 55, and the hydraulic pressure (odd-numbered-shaft-side hydraulic pressure) detected by the odd-numbered-side hydraulic pressure detector 56 or the hydraulic pressure (even-numbered-shaft-side hydraulic pressure) detected by the even-numbered-side hydraulic pressure detector 57 is the setting value or the more, the abnormality is determined by the abnormality diagnosis control section 59.

The hydraulic pressure detected by the odd-numbered-side hydraulic pressure detector 56 according to the odd-numbered intermediate shaft 7 determined as the non-use state or the hydraulic pressure detected by the even-numbered-side hydraulic pressure detector 57 according to the even-numbered intermediate shaft 8 determined as the non-use state, and the hydraulic pressure detected by the primary hydraulic pressure detector 55 are subjected to the same pressure.

For this reason, the control device 46 for the transmission 3 can easily detect the abnormality by comparing the primary hydraulic pressure and the odd-numbered-shaft-side hydraulic pressure or the even-numbered-shaft-side hydraulic pressure, as described above. Further, with the configuration, the abnormality of the primary hydraulic pressure detector 55 can be detected, as well as the abnormality of the odd-numbered-side hydraulic pressure detector 56 and the even-numbered-side hydraulic pressure detector 57.

With the control device 46 for the transmission 3, when the difference between the primary hydraulic pressure detected by the primary hydraulic pressure detector 55 and the hydraulic pressure detected by the odd-numbered-side hydraulic pressure detector 56 or the even-numbered-side hydraulic pressure detector 57 is less than the setting value, the first compensation control section 64 of the abnormality diagnosis control section 59 compensates the hydraulic pressure of the odd-numbered-side hydraulic pressure detector 56 or the even-numbered-side hydraulic pressure detector 57 to the hydraulic pressure detected by the primary hydraulic pressure detector 55.

Since the control device 46 of the transmission 3 configured as described above can correct the error of the odd-numbered-side hydraulic pressure detector 56 and the even-numbered-side hydraulic pressure detector 57, the odd-numbered clutch 9 and the even-numbered clutch 10 can be always reliably controlled.

With the control device 46 for the transmission 3, when the difference between the primary hydraulic pressure detected by the primary hydraulic pressure detector 55 and the hydraulic pressure detected by the odd-numbered-side hydraulic pressure detector 56 or the even-numbered-side hydraulic pressure detector 57 is the setting value or more, the second compensation control section 65 of the abnormality diagnosis control section 59 compensates the hydraulic pressure detected by the primary hydraulic pressure detector 55, the odd-numbered-side hydraulic pressure detector 56 or the even-numbered-side hydraulic pressure detector 57, of which the pressure difference is the setting value or more, by any one of primary hydraulic pressure detector 55, the odd-numbered-side hydraulic pressure detector 56, and the even-numbered-side hydraulic pressure detector 57, of which the pressure difference is less than the setting value.

With the control device 46 for the transmission 3 configured as described above, in the case where the abnormality occurs at any one of the primary hydraulic pressure detector 55, the odd-numbered-side hydraulic pressure detector 56, and the even-numbered-side hydraulic pressure detector 57, the abnormal hydraulic pressure detector can be compensated to the hydraulic pressure of the normal hydraulic pressure detector, thereby carrying out the reliable clutch control even though the abnormal state happens.

The present invention can accurately determine the state of the transmission, and can be applied to a control device for a transmission including a clutch provided between at least two input shafts and an intermediate shaft installed along these input shafts.

What is claimed is:

1. A control device for a transmission for shifting a driving force of an engine, the transmission including at least two input shafts configured to be driven by the driving force of the engine, intermediate shafts provided correspondingly respectively to the two input shafts and configured such that driving forces of the input shafts are respectively transmitted thereto, and a clutch provided between the input shafts and the intermediate shafts and configured to transmit the driving forces from the input shafts to the intermediate shafts, the control device comprising:

a non-use shaft detection section configured to detect a non-use state of the intermediate shafts based on whether the clutch transmits the driving force from the input shafts to the intermediate shafts.

2. The control device for the transmission according to claim 1, wherein the clutch is a hydraulic clutch of which engagement/disengagement operation is controlled by a hydraulic pressure, and the control device further comprises a hydraulic pressure detector configured to detect a hydraulic pressure of oil for use in an operation of the clutch, and an abnormality diagnosis control section configured to perform abnormality diagnosis of a hydraulic pressure detected by the hydraulic pressure detector configured to detect a hydraulic pressure of oil for use in an operation of the clutch provided between the input shafts and the intermediate shafts which is judged during the non-use state by the non-use shaft detection section.

3. The control device for the transmission according to claim 2, further comprising:

an oil passage comprised of a branch passage connected to the clutch to feed the oil to the clutch and a primary passage connected to the branch passage to feed the oil to the branch passage; and hydraulic valves respectively provided in the primary passage and the branch passage to control the hydraulic pressure of the oil to the clutch;

wherein the hydraulic pressure detector comprises an upstream hydraulic pressure detector and a downstream hydraulic pressure detector, wherein the upstream hydraulic pressure detector is provided between the hydraulic valve in the primary passage and the hydraulic valve in the branch passage and is configured to detect an upstream hydraulic pressure in the branch passage, and the downstream hydraulic pressure detector is configured to detect a downstream hydraulic pressure in the branch passage, and wherein when the hydraulic pressure detected by the upstream hydraulic pressure detector and the hydraulic pressure detected by the downstream hydraulic pressure detector configured to detect the downstream hydraulic pressure in the branch passage connected to the intermediate shaft judged during the non-use state are a predetermined setting value or more, the abnormality diagnosis control section judges the hydraulic pressure to be abnormal hydraulic pressure.

4. The control device for the transmission according to claim 3, wherein the abnormality diagnosis control section includes a first compensation control section configured to correct the hydraulic pressure detected by the downstream hydraulic pressure detector to the hydraulic pressure detected by the upstream hydraulic pressure detector, when the difference in hydraulic pressure is less than the predetermined setting value.

5. The control device for the transmission according to claim 4, wherein the abnormality diagnosis control section includes a second compensation control section configured to correct the hydraulic pressure detected by the downstream hydraulic pressure detector of which the difference in hydraulic pressure is the predetermined setting value or more, by the hydraulic pressure detected by one of the upstream and downstream hydraulic pressure detectors of which the difference in hydraulic pressure is less than the predetermined setting value, when the abnormality diagnosis control section judges the hydraulic pressure to be abnormal hydraulic pressure.

6. The control device for the transmission according to claim 3, wherein the abnormality diagnosis control section includes a second compensation control section configured to correct the hydraulic pressure of detected by the downstream hydraulic pressure detector of which the difference in hydraulic pressure is the predetermined setting value or more, by the hydraulic pressure of detected by one of the upstream and downstream hydraulic pressure detectors of which the difference in hydraulic pressure is less than the predetermined setting value, when the abnormality diagnosis control section judges the abnormal hydraulic pressure.

7. The control device for the transmission according to claim 2, further comprising:

an oil passage comprised of a branch passage connected to the clutch to feed the oil to the clutch and a primary passage connected to the branch passage to feed the oil to the branch passage; and hydraulic valves respectively provided in the primary passage and the branch passage to control the hydraulic pressure of the oil to the clutch;

wherein the hydraulic pressure detector; comprises an upstream hydraulic pressure detector and a downstream hydraulic pressure detector, wherein the upstream hydraulic pressure detector is provided between the hydraulic valve in the primary passage and the hydraulic valve in the branch passage and is configured to detect an upstream hydraulic pressure in the branch passage, and the downstream hydraulic pressure detector is configured to detect a downstream hydraulic pressure in the branch passage, and wherein when the hydraulic pressure detected by the upstream hydraulic pressure detector and the hydraulic pressure detected by the downstream hydraulic pressure detector configured to detect the downstream hydraulic pressure in the branch passages respectively connected to two intermediate shafts judged during the non-use state are a predetermined setting value or more, the abnormality diagnosis control section judges the hydraulic pressure to be abnormal hydraulic pressure.

8. The control device for the transmission according to claim 7, wherein the abnormality diagnosis control section includes a first compensation control section configured to correct the hydraulic pressure detected by the downstream hydraulic pressure detector to the hydraulic pressure detected by the upstream hydraulic pressure detector, when the difference in hydraulic pressure is less than the predetermined setting value.

9. The control device for the transmission according to claim 8, wherein the abnormality diagnosis control section includes a second compensation control section configured to correct the hydraulic pressure detected by the downstream hydraulic pressure detector of which the difference in hydraulic pressure is the predetermined setting value or more, by the hydraulic pressure detected by one of the upstream and downstream hydraulic pressure detectors of which the difference in hydraulic pressure is less than the predetermined setting value, when the abnormality diagnosis control section judges the hydraulic pressure to be the abnormal hydraulic pressure.

10. The control device for the transmission according to claim 7, wherein the abnormality diagnosis control section includes a second compensation control section configured to correct the hydraulic pressure detected by the downstream hydraulic pressure detector of which the difference in hydraulic pressure is the predetermined setting value or more, by the hydraulic pressure detected by one of the upstream and downstream hydraulic pressure detectors of which the difference in hydraulic pressure is less than the predetermined setting value, when the abnormality diagnosis control section judges the hydraulic pressure to be the abnormal hydraulic pressure.

11. A control device for a transmission for shifting a driving force of an engine, the transmission including two input shafts configured to be driven by the driving force of the engine, intermediate shafts provided respectively to the two input shafts and configured such that driving forces of the input shafts are respectively transmitted thereto, and a clutch provided between the input shafts and the intermediate shafts and configured to transmit the driving forces from the input shafts to the intermediate shafts, the control device comprising:
- a plurality of gears provided to contact with the intermediate shafts;
- an output shaft meshed with the plurality of gears such that driving forces of the intermediate shafts are transmitted thereto;
- a gear selection section provided to contact within the intermediate shafts and configured to selectively connect at least one gear from the plurality of gears to the intermediate shafts to transmit the driving forces of the intermediate shafts to the output shaft; and
- a non-use shaft detection section configured to detect a non-use state of the intermediate shafts based on whether the gear selection section transmits the driving force of the intermediate shaft to the output shaft.

12. The control device for the transmission according to claim 11, wherein the clutch is a hydraulic clutch of which engagement/disengagement operation is controlled by a hydraulic pressure, and the control device further comprises a hydraulic pressure detector configured to detect a hydraulic pressure of oil for use in an operation of the clutch, and an abnormality diagnosis control section configured to perform abnormality diagnosis of a hydraulic pressure detected by the hydraulic pressure detector configured to detect a hydraulic pressure of oil for use in an operation of the clutch provided between the input shafts and the intermediate shafts which is judged as the non-use state by the non-use shaft detection section.

13. The control device for the transmission according to claim 12, further comprising:
- an oil passage comprised of a branch passage connected to the clutch to feed the oil to the clutch and a primary passage connected to the branch passage to feed the oil to the branch passage; and
- hydraulic valves respectively provided in the primary passage and the branch passage to control the hydraulic pressure of the oil to the clutch;
- wherein the hydraulic pressure detector comprises an upstream hydraulic pressure detector and a downstream hydraulic pressure detector, wherein the
- upstream hydraulic pressure detector is provided between the hydraulic valve in the primary passage and the hydraulic valve in the branch passage and is configured to detect an upstream hydraulic pressure in the branch passage, and
- the downstream hydraulic pressure detector is configured to detect a downstream hydraulic pressure in the branch passage, and
- wherein when the hydraulic pressure detected by the upstream hydraulic pressure detector and the hydraulic pressure detected by the downstream hydraulic pressure detector configured to detect the downstream hydraulic pressure in the branch passage connected to the intermediate shaft which is judged during the non-use state are a predetermined setting value or more, the abnormality diagnosis control section judges the hydraulic pressure to be abnormal hydraulic pressure.

14. The control device for the transmission according to claim 13, wherein the abnormality diagnosis control section includes a first compensation control section configured to correct the hydraulic pressure detected by the downstream hydraulic pressure detector to the hydraulic pressure detected by the upstream hydraulic pressure detector, when the difference in hydraulic pressure is less than the predetermined setting value.

15. The control device for the transmission according to claim 14, wherein the abnormality diagnosis control section includes a second compensation control section configured to correct the hydraulic pressure detected by the downstream hydraulic pressure detector of which the difference in hydraulic pressure is the predetermined setting value or more, by the hydraulic pressure detected by one of the upstream and downstream hydraulic pressure detectors of which the difference in hydraulic pressure is less than the predetermined setting value, when the abnormality diagnosis control section judges the hydraulic pressure to be the abnormal hydraulic pressure.

* * * * *